United States Patent [19]
Yamamoto et al.

[11] Patent Number: 6,055,113
[45] Date of Patent: Apr. 25, 2000

[54] OPTICAL PICKUP AND AN OPTICAL PICKUP OBJECTIVE LENSE ASSEMBLING METHOD

[75] Inventors: Kenji Yamamoto, Tokyo; Isao Ichimura, Kanagawa; Fumisada Maeda, Tokyo; Toshio Watanabe; Akira Suzuki, both of Kanagawa; Kiyoshi Ohsato, Chiba, all of Japan

[73] Assignee: Sony Corporation, Tokyo, Japan

[21] Appl. No.: 09/035,138

[22] Filed: Mar. 5, 1998

[30] Foreign Application Priority Data

Mar. 6, 1997 [JP] Japan ................................. 9-052160

[51] Int. Cl.$^7$ ........................................ G02B 7/02
[52] U.S. Cl. .................... 359/661; 359/667; 359/717; 359/793; 359/819; 359/821
[58] Field of Search ................... 359/661, 717, 359/793, 667, 819, 821

[56] References Cited

U.S. PATENT DOCUMENTS

| | | | |
|---|---|---|---|
| 2,161,368 | 6/1939 | McLeod | 359/819 |
| 4,662,717 | 5/1987 | Yamada et al. | 359/819 |
| 4,953,959 | 9/1990 | Ishiwata et al. | 359/661 |
| 5,467,225 | 11/1995 | Manabe | 359/661 |

*Primary Examiner*—Georgia Epps
*Assistant Examiner*—Evelyn A. Lester
*Attorney, Agent, or Firm*—Ronald P. Kananen; Rader, Fishman & Grauer

[57] ABSTRACT

This invention intends to provide an optical pickup of which it is possible to limit aberrations within a tolerable limit without incorporating a special device for that purpose even if errors arise in thickness of component lenses of a two-lens system constituting an element of the pickup. This object is achieved by providing an optical pickup incorporating a two-lens system with first and second lenses 13 and 14 being arranged in the following manner: the first lens has a first surface 15 to receive a laser beam radiated from a semiconductor laser and a second surface 16 to direct the laser beam transmitted from the first surface 15 towards the second lens 14; the second lens 14 has a third surface 17 to receive the light flux transmitted from the second surface 16 and a fourth surface 18 to direct the light flux transmitted from the third surface 17 towards an optical disc placed opposite thereto; and the first and fourth surfaces are used as a reference during positioning.

8 Claims, 29 Drawing Sheets

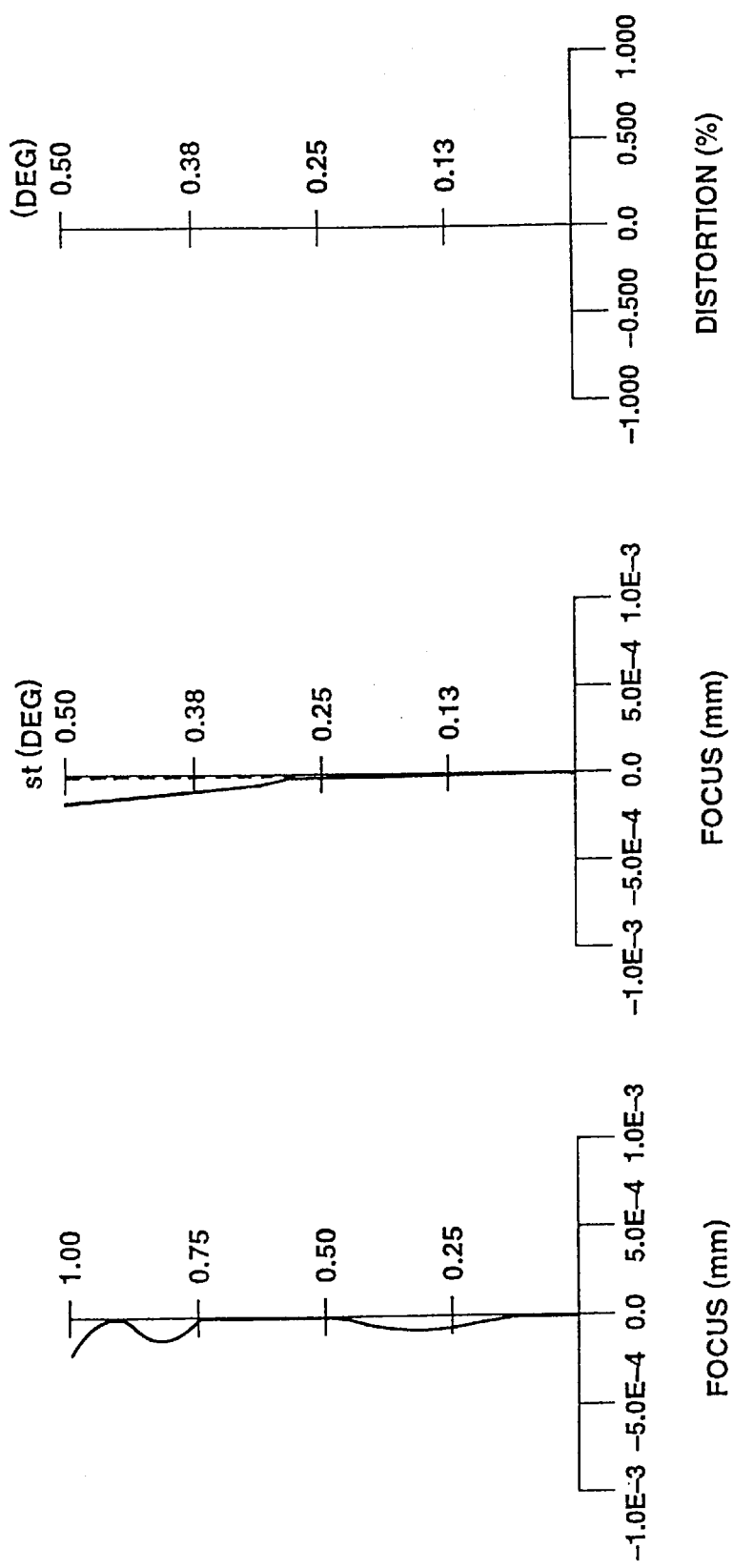

OPTICAL PICKUP AND AN OPTICAL PICKUP OBJECTIVE LENSE ASSEMBLING METHOD

BACKGROUND OF THE INVENTION

This invention relates to an optical pickup which, consisting of a two-lens system, reads and writes information signals from and onto an optical recording medium such as an optical disc, magneto-optical disc or optical card, and to an assembling method for assembling objective lenses as the two-lens system for the optical pickup.

Prior Art

To date, various optical recording media such as optical disks, magneto-optical disks or optical cards have been proposed as a recording medium for information signals. The optical pickup has also been proposed to write and read information signals onto and from such an optical recording medium by radiating a beam from a source onto the optical recording medium.

With the aforementioned optical pickup, the objective lens can reduce the diameter of spot of a light beam converged on such an optical recording medium by enlarging its numerical aperture (NA), and thus increase the density of information signals inscribed on the optical recording medium. For example, the conventional objective lens has an NA of about 0.6 at its limit.

In order to enlarge the NA of an objective lens, a two-lens system 105 has been proposed as shown in FIG. 1 which consists of a first lens 102 upon which a light flux 101 from a diaphragm 100 is converged, and a second lens 104 which converges the light flux transmitted from the first lens 102 onto the recording surface 103a of an optical recording medium 103.

To put it more specifically, the two-lens system 105 described above consists of the first lens 102 which has a first surface 106 upon which a light flux 101 from a source is incident and a second surface 107 which sends the light flux transmitted from the first surface towards the second lens 104, and the second lens 104 which has a third surface 108 upon which is incident the light flux sent from the second surface 107 of the first lens 102 and a fourth surface 109 which directs the light flux transmitted from the third surface 108 onto the optical recording medium 103 placed opposite to it. It is possible for the two-lens system 105 with above composition to have an NA of 0.8 or more.

To be more specific, the two-lens system 105 is designed in such a manner that the first lens 102 may give a most appropriate thickness, i.e., an interval $L_1$ between the first and second surfaces 106 and 107, and the second lens 104 may give a most appropriate thickness or an interval $L_2$ between the third and fourth surfaces 108 and 109. The first and second lenses 102 and 104 are produced through glass-molding based on the use of a die.

The two-lens system 105 requires precise assembling of involved lenses in contrast with an objective lens which is composed of a single lens, or an accurate positioning, for example, of the first and second lenses. This is because otherwise the resulting aberration would exceed a tolerable range.

The above-described positioning is carried out, for example, by selecting two surfaces from the first, second, third and fourth surfaces 106, 107, 108 and 109. With the conventional system, positioning is carried out, for example, using a spacer for the interval $L_3$ between the second surface 107 of first lens 102 and the third surface 108 of second lens 104 as a reference, regardless of how much error is involved in the lens thickness, and the resulting assembly is installed in an optical pickup.

To minimize aberrations of the two-lens system 105, it is necessary to limit the error within a range less than several micrometers concerning the thickness $L_1$ of first lens 102, the thickness $L_2$ of second lens 104, the interval $L_3$ between the first and second lenses 102 and 104.

However, it is quite difficult with current standards of technology to limit the error of thickness of the first and second lenses 102 and 104 within a range of several micrometers or less because the thickness in question is adjusted by the weight of glass material used for glass molding. Typically, the thickness of lens produced through glass molding has an error of $\pm 10 \mu m$.

When the first and second lenses 102 and 104 are assembled, while their thicknesses have an error of above range, with the interval $L_3$ between the second and third surfaces 107 and 108 used as a reference, the total length of two-lens system 105 or the interval between the first and fourth surfaces 106 and 109 may differ from a specified length by that error. If such system were put to use without being properly corrected, the aberration of two-lens system might exceed a tolerable range.

It is worthy of notice here that the error involved in positioning of first and second lenses can be put within a range of several micrometers.

If the second lens 104 has an inclination θ and a shift d with respect to the first lens 102 as shown in FIGS. 2A and 2B, the two-lens system 105 will develop an intolerably large error owing to its large refractive activity.

Although it may be possible to add a special device to the two-lens system 105 to meet that problem, it would result in increase of the production cost.

SUMMARY OF THE INVENTION

With situations as described above as a background this invention has been proposed, and intends to provide an optical pickup in which it is possible to limit aberrations within a tolerable range without resorting to some special device even though errors are produced in the thickness of two-lens system, and a method of assembling objective lenses for such an optical pickup.

The optical pickup according to this invention, to solve above problem, has a lens tube which has been so designed as to have a reference value, to provide a distance between a reference surface of the first surface mounting and a reference surface of the fourth surface mounting. Accordingly, with this optical pickup, the interval between the first and the fourth surfaces of the two-lens system serves as the reference value.

Further, the pickup according to this invention, to solve the above problem, has a lens tube which has been so designed as to have a reference value, to provide a distance between a reference surface mounting reference surface of the second surface and a reference surface mounting reference surface of the fourth surface. Accordingly, with this optical pickup, the interval between the second and the fourth surfaces of the two-lens system serves as a reference value.

Furthermore, the method according to this invention of assembling objective lenses for an optical pickup, to solve above problem, consists of assembling the two-lens system such that the interval between the first and the second lens surfaces may correspond with the reference value.

Still further, the method according to this invention of assembling objective lenses for an optical pickup consists of assembling the two-lens system such that the interval between the second and the fourth lens surfaces may correspond with the reference value.

BRIEF DESCRIPTION OF THE DRAWINGS

FIG. 5, consisting of FIGS. 5A through 5C, gives the optical characteristics of the two-lens system including spherical aberration, astigmatism and distortion.

DESCRIPTION OF THE PREFERRED EMBODIMENTS

Preferred embodiments of this invention will be described below with reference to a number of attached drawings.

Firstly, the first embodiment is an optical pickup which converges a laser beam from a semiconductor laser through a two-lens system including first and second lenses onto the signal recording surface of an optical disc. Namely, in this optical pickup, the two-lens system constitutes an objective lens.

Figure 4:
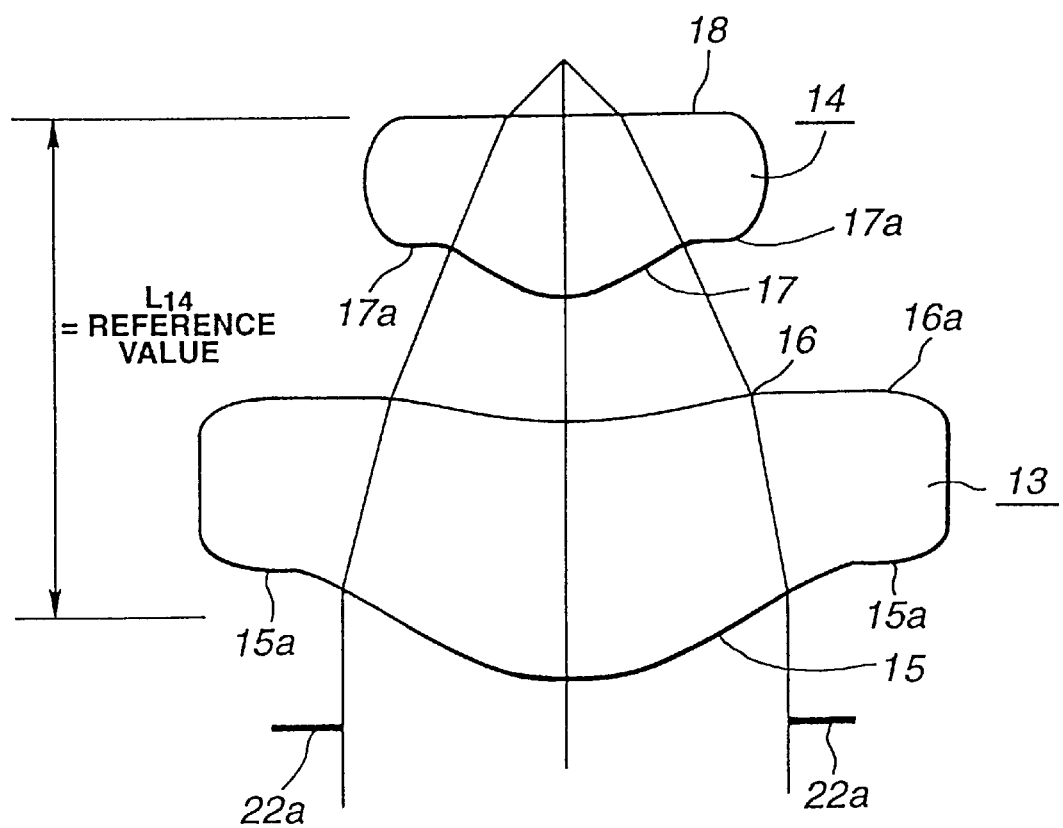
FIG. 4 gives a frontal view of a two-lens system installed in the optical pickup constituting the first example of this invention.

The two-lens system consists, as shown in FIG. 4, of a first lens 13 which has a first surface 15 upon which a laser beam from a semiconductor laser is incident and a second surface 16 which sends the laser beam transmitted from the first surface 15 towards a second lens 14, and a second lens 14 which has a third surface upon which the light flux sent from the second surface 16 is incident and a fourth surface 18 which directs the light flux transmitted from the third surface 17 onto an optical disc placed opposite thereto.

The two-lens system 3 is so installed in an optical pickup as to allow the interval between the first and fourth surfaces 15 and 18 to correspond with a reference value.

Figure 1:
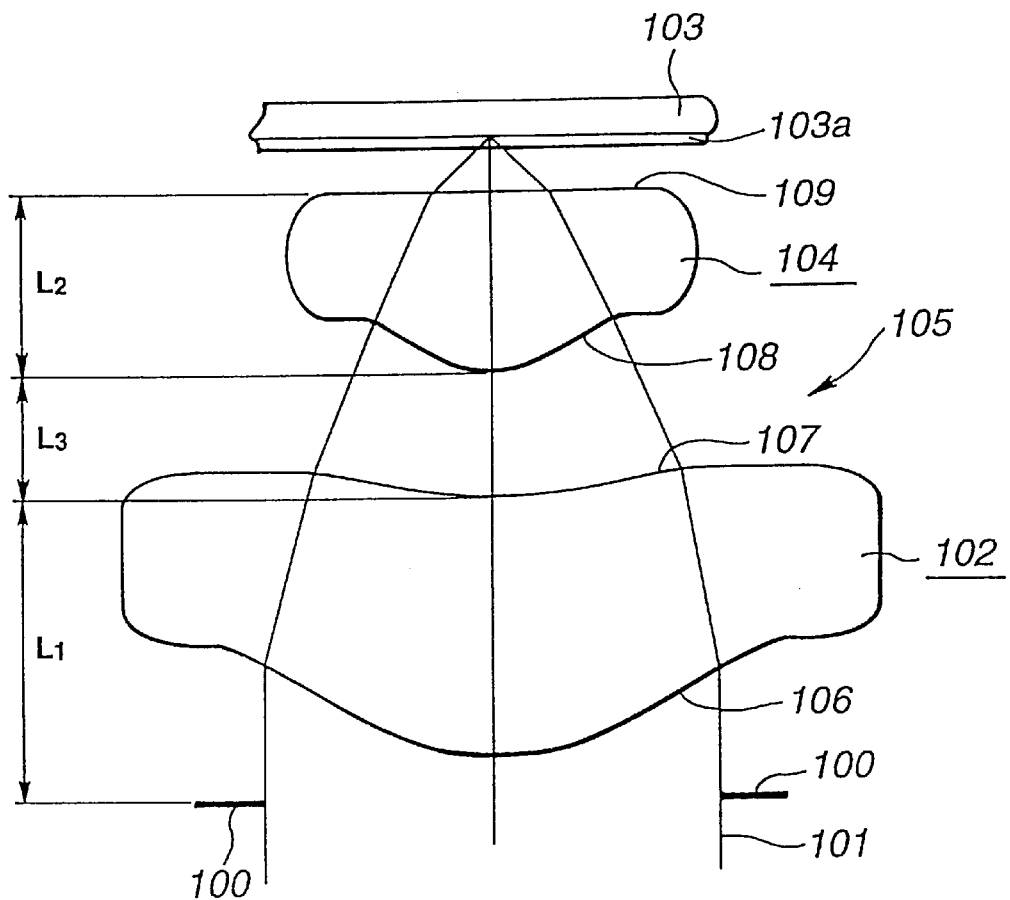
FIG. 1 gives a frontal view of a two-lens system used for illustration of the conventional two-lens system.
Figure 2A:
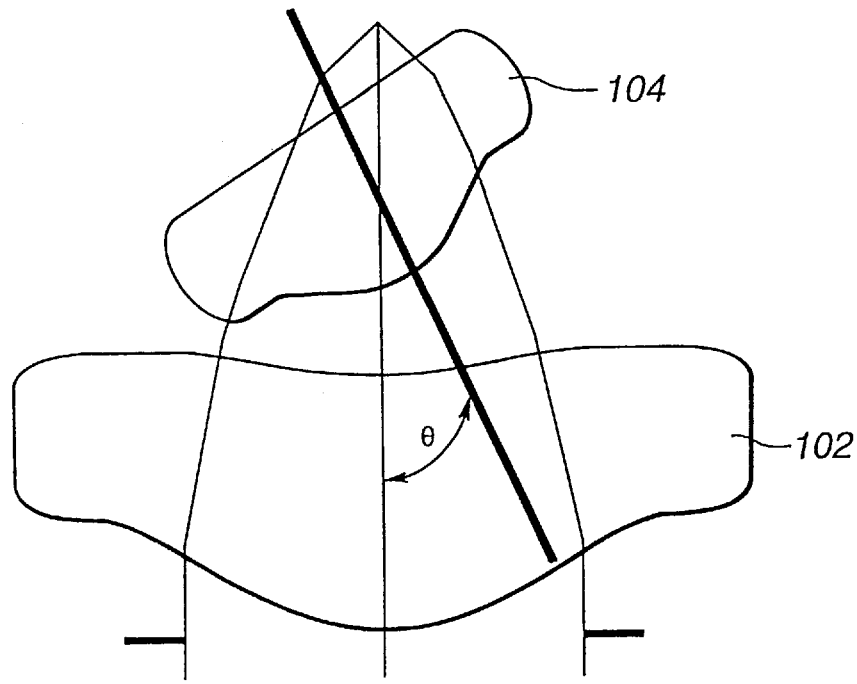
FIG. 2, consisting of FIGS. 2A and 2B, gives a frontal view of a two-lens system in which a second lens is inclined or displaced with respect to a first lens.
Figure 2B:
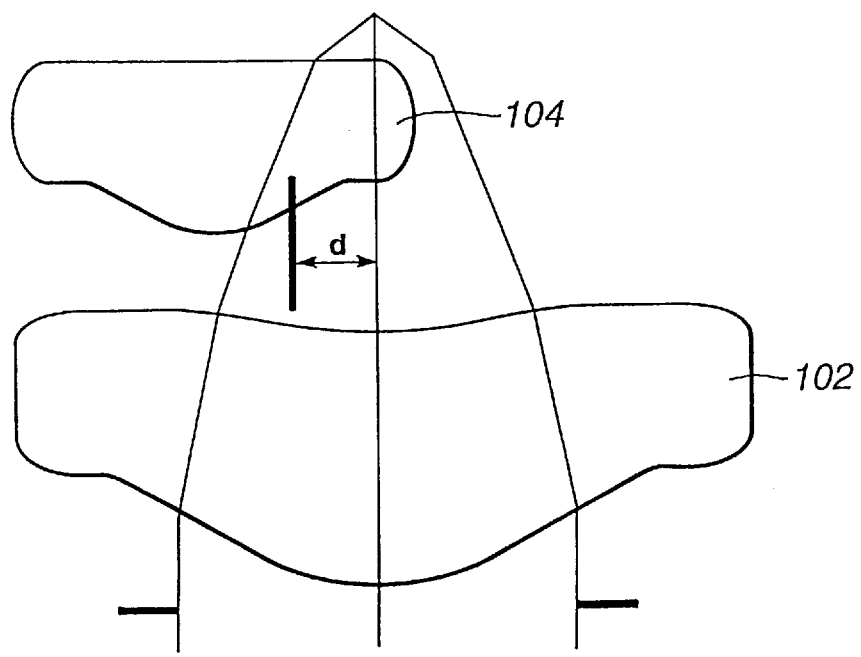
Figure 3:
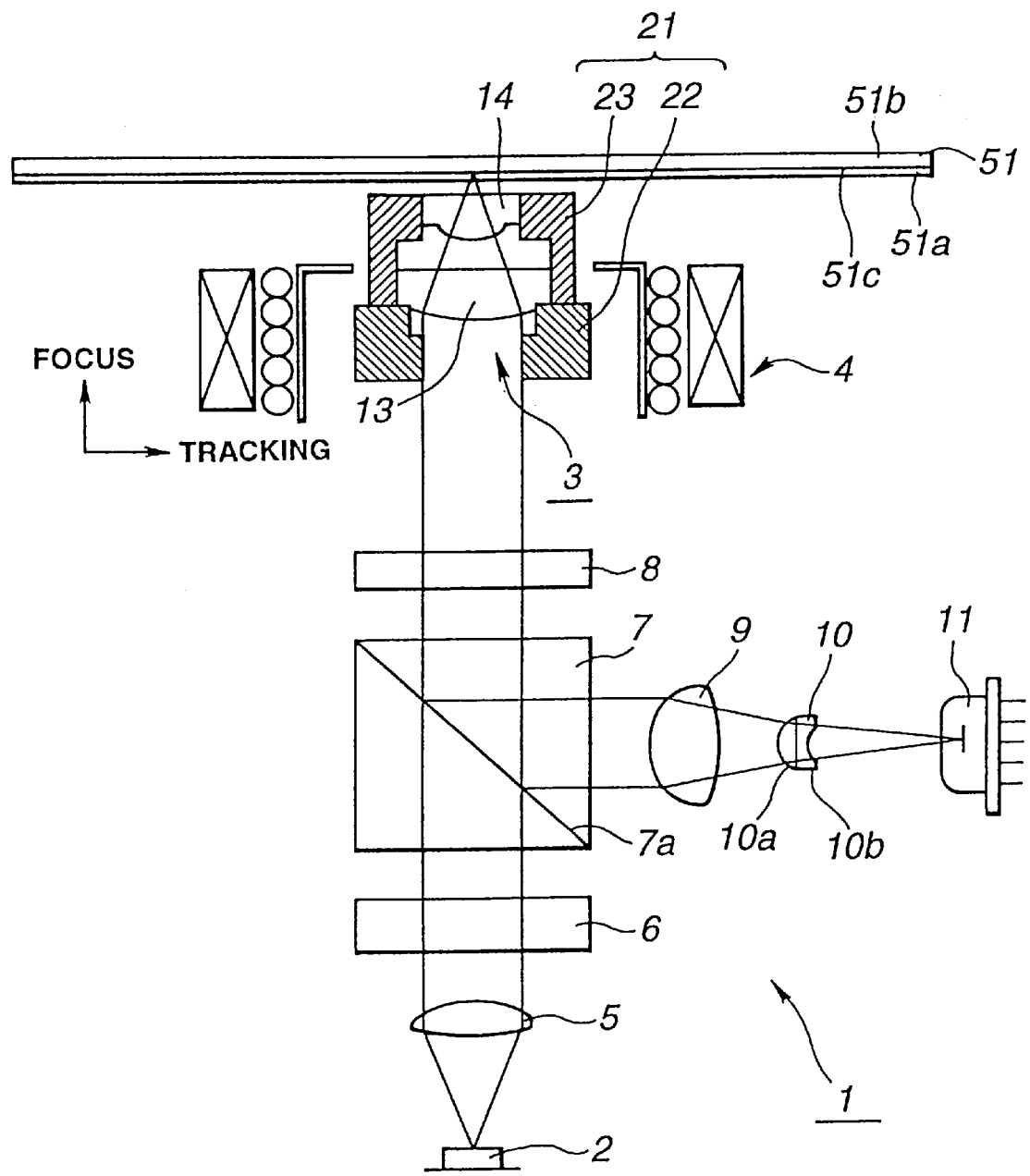
FIG. 3 illustrates the composition of an optical pickup constituting the first example of this invention.

The optical disc has, as shown in FIG. 3, a transparent base plate 51a with a thickness of 0.1 mm on the surface to receive light. In addition, the optical disc 51 has a glass substrate 51b of 1.2 mm thick to support the transparent base plate 51a. Then, the optical disc 51 has a signal recording layer 51c inserted between the transparent base plate 51a and glass substrate 51b, and a light beam from a semiconductor laser 2 is converged by the two-lens system 3 onto that recording layer 51c.

The optical pickup has, as shown in FIG. 3, a semiconductor laser 2 for emitting a laser beam and the two-lens system 3 whose optical axis is aligned with the semiconductor laser 2 for converging the laser beam onto the recording surface 51c of optical disc 51. The optical pickup 1 is further provided with a biaxial actuator 4 to support the two-lens system 3.

The optical pickup 1 is still further provided with a collimator lens 5 arranged between the semiconductor laser 2 and the two-lens system 3 so as to have an optical axis matched, a diffraction grating 6, a polarized beam splitter 7 and a λ.4 wavelength plate 8 when enumerated in order from the side of the semiconductor laser 2.

The optical pickup 1 is still further provided with a converging lens 9, a multi-lens 10 and a photodetector 11 at a place upon which a beam coming from an optical disc 51 and reflected from the reflective surface 7a of polarized beam splitter 7 is incident.

The semiconductor laser 2 generates a laser beam with a wavelength of 635 nm. This laser beam is incident on the collimator lens 5.

The collimator lens 5 turns the incident laser beam into a parallel light flux and directs it towards the diffraction grating 6.

The diffraction grating 6 is a plate with parallel planes which has a diffraction grating inscribed on one of its main surfaces, and divides the incident light flux at least into three light fluxes including 0th order flux and ± first order fluxes. The individual light fluxes produced by the diffraction grating 6 will serve as a main beam and sub-beams respectively when a three-beam method is put into practice, a method by which to detect signals suffering from tracking errors. The light fluxes produced as a result of splitting by the diffraction grating 6 is incident on the polarized beam splitter 7.

The polarized beam splitter 7 has a reflective surface 7a which is so constructed as to transmit a light flux from the diffraction grating 6. The reflective surface 7a has, as will be described later, an optical characteristic to reflect a beam reflected from the optical disc 51. Thus, a light flux from the diffraction grating 6, without being reflected by the reflective surface 7a of polarized beam splitter 7, passes through it towards the λ.4 wavelength plate 8.

The λ.4 wavelength plate 8 is a plate with approximately parallel planes, and allows a light flux from the polarized beam splitter 7 to pass through. In addition, as will be described later, the λ.4 wavelength plate 8 has an optical characteristic to polarize by 90 degree beam reflected from the recording surface 51c of optical disc 51. A light beam passing through this λ.4 wavelength plate 8 is incident on the two-lens system 3.

The two-lens system 3 is composed of first and second lenses 13 and 14 having aspherical surfaces with a specified interval between them, as shown in FIGS. 3 and 4.

The first lens 13 has a first surface 15 upon which a light flux from the λ.4 wavelength plate 8 is incident, and a second surface 16 which directs outward the light flux transmitted from the first surface 15. With this first lens 13, the first surface 15 is so constructed as to direct its aspherical convex surface towards the λ.4 wavelength plate 8, and to have a flat surface 15a at periphery. The second surface 16 is so constructed as to direct its aspherical convex surface in the direction towards which light advances, and to have a flat surface 16a at periphery. To put it otherwise, the first lens 13 has two aspherical surfaces which are transformed into flat plates at periphery.

The second lens 14 has a third surface 17 upon which a light flux from the second surface 16 of first lens 13 is incident, and a fourth surface 18 which directs the light flux transmitted from the third surface 17 towards an optical disc 51.

With this second lens 14, the third surface 17 is so constructed as to direct its aspherical convex surface towards the first lens 13 placed opposite to it, and to have a flat surface 17a at periphery. The fourth surface 18 is, as described above, a surface opposite to an optical disc 51, and is made flat.

The two-lens system 3 is so designed as to give a reference interval $L_{14}$ between the first surface 15 of first lens 13 and the fourth surface 18 of second lens 14, and to have the second lens 14 placed apart from the first lens 13.

Here the designing data of first and second lenses 13 and 14 are given in Tables 1 and 2.

TABLE 1

|  | RDY (radius of curvature) | THI (thickness) | GLA (name of glass) |
|---|---|---|---|
| OBJ | Infinite distance | Infinite distance |  |
| STO | Infinite distance | 0.0 |  |
| First surface | 2.43644<br>K: −0.530603<br>A: 0.462792E-03<br>D: −0.526207E-06 | 2.297518<br><br>B: −0.131930E-03<br>E: 0.0 | First lens<br><br>C: −0.216921E-04<br>F: 0.0 |
| Second surface | 19.29810<br>K: −26.403411<br>A: −0.838023E-03<br>D: 0.0 | 1.042695<br><br>B: 0.455037E-03<br>E: 0.0 | <br><br>C: 0.502887E-04<br>F: 0.0 |
| Third surface | 1.50881<br>K: −0.198463<br>A: −0.999579E-03<br>D: −0.317005E-02 | 1.500<br><br>B: −0.127468E-03<br>E: 0.0 | Second lens<br><br>C: 0.579594E-04<br>F: 0.0 |
| Fourth surface | Infinite distance<br>K: 0.0<br>A: 0.0<br>D: 0.0 | 0.3<br><br>B: 0.0<br>E: 0.0 | <br><br>C: 0.0<br>F: 0.0 |
| Surface upon which light is incident | Infinite distance | 0.1 | CG |
| Signal bearing surface | Infinite distance | 0.0 |  |
| IMG | Infinite distance | 0.0 |  |

TABLE 2

| EPD (exit pupil diameter (mm)) | 4.500 |
|---|---|
| WL (wavelength (nm)) | 635 |
| Name of glass | Refractive index/ Abbe number |
| First lens | 1.493009/86.1 |
| Second lens | 1.587007/61.3 |
| CG (cover glass) | 1.533 |

As shown in Tables 1 and 2, an optical lens having optical characteristics with a refractive index of 1.493009 and Abbe number of 86.1 is made into the first lens 13. An optical lens having optical characteristics with a refractive index of 1.187007 and Abbe number of 61.3 is made into the second lens 14. To be more specific, a lens material called "FCD1" (trade name) provided by Hoya Co. can be made into the first lens 13, while a lens material called "BACD5" (trade name) provided by Hoya Co. can be made into the second lens 14.

Table 1 also gives the data regarding radius of curvature (RDY) and thickness (THI) of the first, second, third and fourth surfaces.

K in Table 1 represents a cone coefficient. A, B, C, D, E and F represent the fourth, sixth, eighth, tenth, twelfth and fourteenth order coefficients of non-sphericity respectively.

The geometry of first, second, third and fourth surfaces can be derived after above values have been put into the non-sphericity equation (1).

$$X = (Y^2/R)/(1 + (1 - (1 + K)(Y/R)^2))^{1/2} + \\ A \times Y^4 + B \times Y^6 + C \times Y^8 + D \times Y^{10} + E \times Y^{12} + F \times Y^{14} \quad (1)$$

where X represents a depth from the vertex of surface, Y represents a height from optical axis, and R represents a radius of curvature of proximal axis.

Table 1 further gives, with regard to the transparent substrate 51a, the data regarding radius of curvature and thickness of the surface (CG or cover glass) upon which light is incident, signal recording surface 51c and image surface (IMG). As shown in Table 2, the exit pupil diameter (EPD) and wavelength (WL) of laser beam are 4.500 mm and 635 nm, respectively.

For the data listed in Table 1, the object (OBJ) is at an infinitely distant position, and the rim of diaphragm 22a (STO) depicted in FIG. 4 is placed just in front of the first surface 15.

With the optical system with above constitution, the two-lens system 3 has an aperture number of 0.7 to 0.95. Aberrations inherent to the two-lens system 3 are as shown in FIGS. 5–7.

Firstly, FIGS. 5A to 5C indicate the spherical aberration, astigmatism and distortion of two-lens system.

The spherical aberration of two-lens system 3 is small and nearly constant regardless of height from the optical axis at which the measurement is performed as seen from FIG. 5A.

Further, as shown in FIG. 5B, the astigmatism or a difference in focal length between a tangential direction and a sagittal direction is small regardless of angle with which incident light impinges.

Furthermore, with regard to the distortion of two-lens system 3, as shown in FIG. 5C, no distortion is observed even though the angle with which incident light impinges varies as much as 0.50 degree.

Figure 6A:
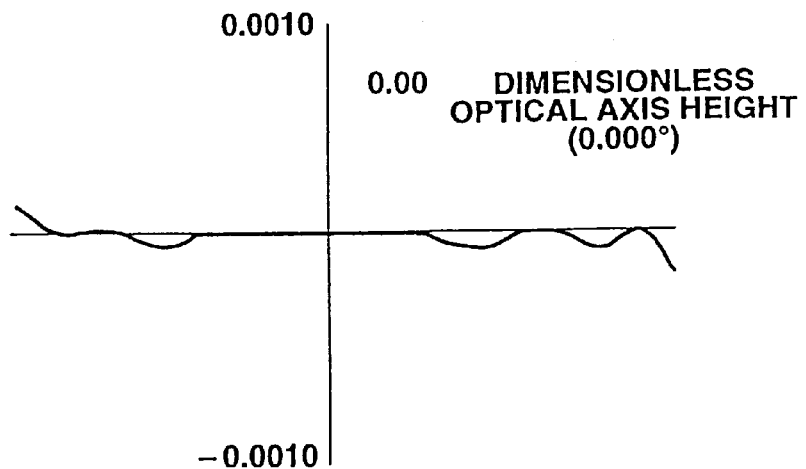
FIG. 6, consisting of FIGS. 6A and 6B gives the optical characteristic or coma in tangential and sagittal directions when the incident light beam has an angle of 0.000° or in the direction of optical axis.
Figure 6B:
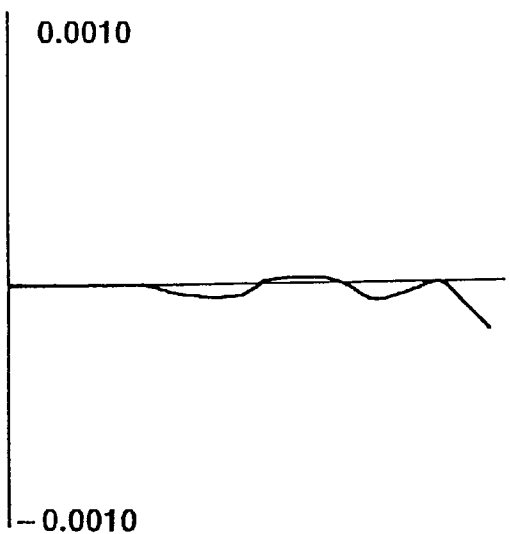

Still further, with regard to coma, as shown in FIGS. 6A and 6B, even when the height of incident light is varied and the resulting focus is compared with that of the incident light with the height from optical axis being 0.00 and incident angle being 0 degree, only small differences appear in both of tangential and sagittal directions.

Figure 7A:
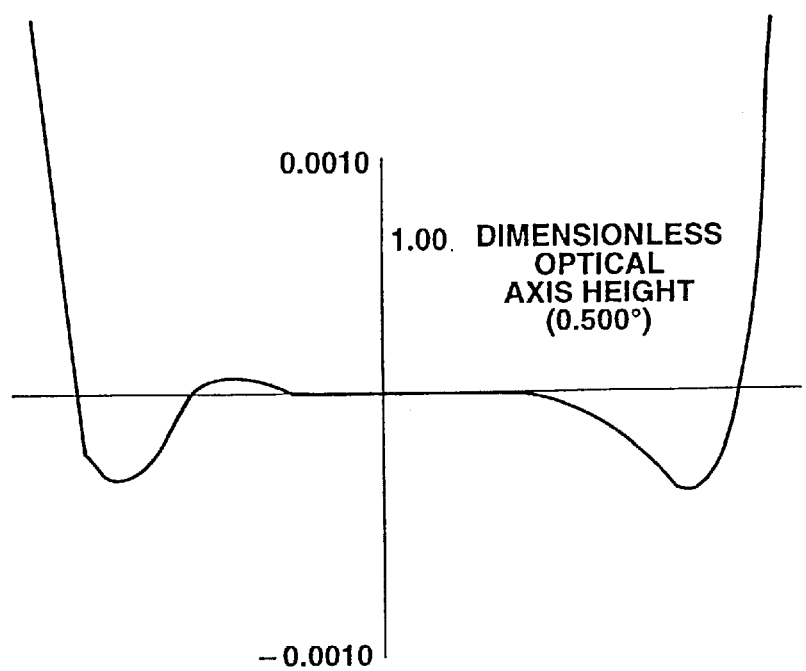
FIG. 7, consisting of FIGS. 7A and 7B, gives the optical characteristic or coma in tangential and sagittal directions when the incident light beam has an angle of 0.500°.
Figure 7B:
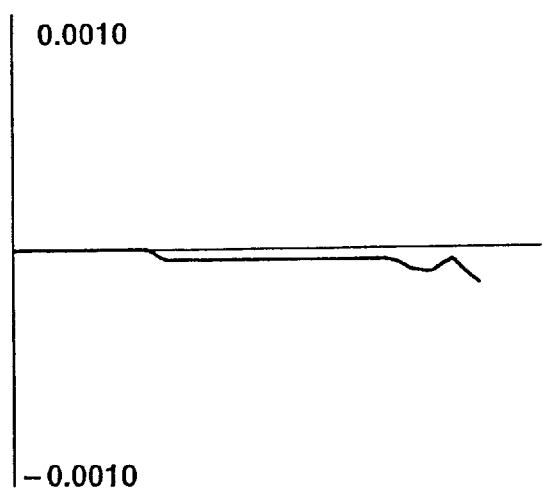

Still further, as shown in FIG. 7A, coma which is experienced by an incident light beam with the height from optical axis of 1.00 and incident angle of 0.5 degree increases when the height is altered in a tangential direction. Coma which is experienced by an incident light beam with the height from optical axis of 1.00 and incident angle of 0.5 degree is only slight even when the height is altered in a sagittal direction as shown in FIG. 7B.

The two-lens system 3, as described above, has the second lens 14 placed apart from the first lens 13 such that the interval between the first and the fourth surfaces 15 and 18 may take a constant length of $L_{14}$. Thus, the two-lens system can be said to contain, so to say, another refractive lens (third lens) made of air between the first and the second lenses 13 and 14.

Accordingly, if the first lens 13 or the second lens 14 has an error in thickness, the third lens is forcibly altered of its thickness by the same absolute value of that error.

Let's assume that an error arises in the thickness of first lens 13 or second lens 14. It causes the responsible lens to produce an aberration. It also causes the third lens to produce an aberration of opposite polarity to that caused by the first or second lens as the case may be.

To put it otherwise, with the two-lens system 3, even when an error arises in the thickness of first or second lens, it is compensated in the total system because the same error with the opposite polarity occurs concurrently in the third lens.

Accordingly, as long as the two-lens system 3 is assembled such that the interval $L_{14}$ between the first and the fourth surfaces 15 and 18 corresponds with a reference value as initially designed, aberrations caused by errors in the thickness of lenses can be prevented.

As a result, even when the two-glass lens 3 is manufactured through glass-molding, and suffers from an error in thickness due to work precision, aberrations caused by that error can be prevented.

Figure 8:
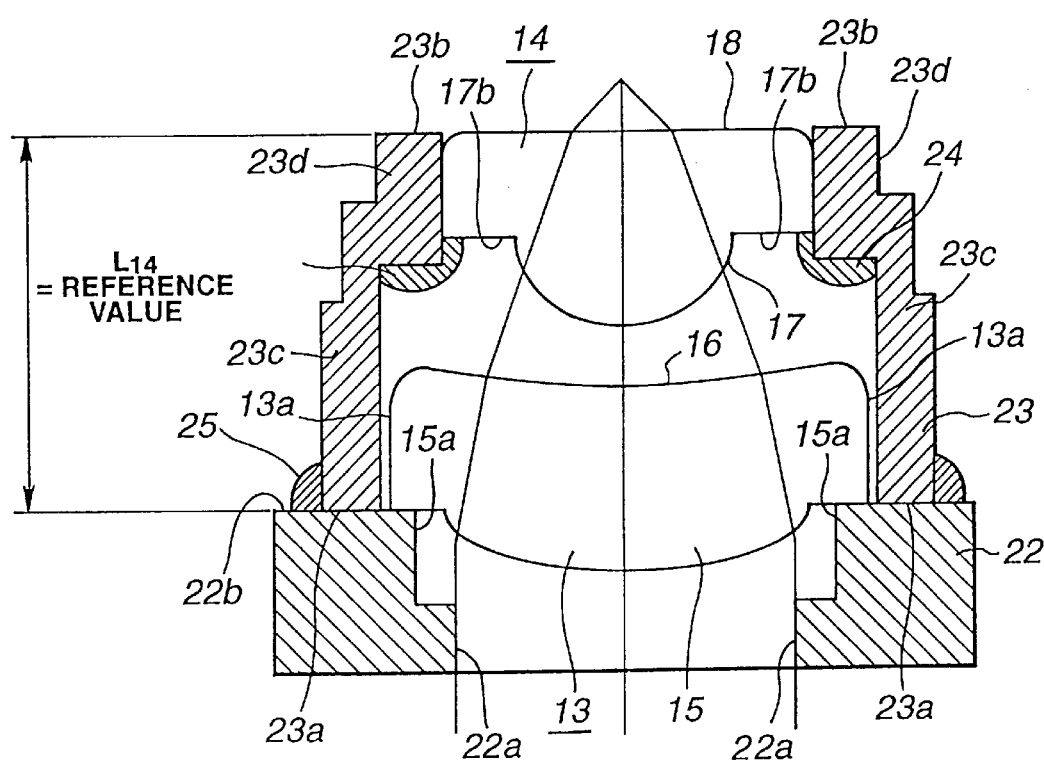
FIG. 8 gives a sectional view of the lens tube incorporating the two-lens system.

With the optical pickup 1, as shown in FIG. 8, the two-lens system 3 is composed of the first and the second lenses 13 and 14 placed in a lens tube 21.

The lens tube 21 is composed of a lens supporting section 22 to support the first lens 13 and a lens storing section 23, cylindrical in shape to store the second lens 14. The lens tube 21 has first and second mounting reference surfaces 23a and 23b in the lens storing section 23. The first and the second mounting reference surfaces 23a and 23b are designed such that their interval corresponds with a reference value, and will serve as references when positioning of the first and the second lenses 13 and 14 is carried out.

The lens supporting section 22 of lens tube 21 has a cylindrical shape. The lens supporting section 22 has a diaphragm 22a to adjust the intensity of incoming light flux and a supporting surface 22b to support the first surface 15 of the first lens 13 at its one end. The first lens 13 is stabilized by attaching the periphery 15a of first surface 15 to the supporting surface 22b. Namely, the lens supporting section adjusts the flux of light incident on the first lens supported by the lens supporting surface 22b with the diaphragm 22a.

The lens storing section 23 of lens tube 21 has, on one end, a first mounting reference surface 23a which joins with the lens supporting surface 22b of lens supporting section 22, and has, on the other end, a second mounting reference surface 23b.

Further, the lens storing section 23 has, on one end, a first storing segment 23c which is so prepared as to surround the periphery 13a of first lens 13, and has, on the other end, a second storing segment 23d which is so prepared as to accommodate the second lens 14.

The second lens 14 is stored in the second storing segment 23a in such a way as to make the fourth surface 18 flush with the second mounting reference surface 23b. The second lens 14 is fixed to the inner surface of second storing segment 23d through an adhesive 24.

The lens storing section 23, while storing the first lens 13 in the first storing segment 23a, has the first mounting reference surface 23a jointed with the supporting surface 22b of lens supporting section 22. The lens storing segment 23 is jointed with the lens supporting section 22 through an adhesive 25.

Thus, with the two-lens system 3, the first surface 15 becomes flush with the supporting surface 22b of lens supporting section 22, and the fourth surface 18 becomes flush with the second reference surface 23b of lens storing section 23, thereby putting the interval $L_{14}$ between the first and the fourth surfaces 15 and 17 in agreement with a reference value.

Further, as the two-lens system 3 is fixed with respect to the lens tube 21, inclination and shift of the central axis of second lens 14 with respect to that of first lens 13 can be prevented.

The two-lens system 3 is supported, as shown in FIG. 3, with a biaxial actuator 4 by way of the lens tube 21.

The biaxial actuator 4 adjusts the movement of two-lens system 3 in focusing and tracking directions, based on focusing and tracking error signals.

The two-lens system 3 supported by the biaxial actuator 4 converges a light beam on the signal recording surface 51c of an optical disc 51. The converged beam is reflected from the signal recording surface 51c, to become a reflected beam incident on the fourth surface 18 of two-lens system 3.

The two-lens system 3 transmits the reflected beam, and directs it towards the λ4 wavelength plate 8. The λ4 wavelength plate 8 polarizes the incident beam by 90° and directs it towards a polarized beam splitter 7.

The polarized beam splitter 7 reflects the reflected beam which has undergone polarization through passage of the λ4 wavelength plate 8 at the reflective surface 7a. The light flux reflected from the reflective surface 7a is directed towards a converging lens 9.

The converging lens 9 converges the reflected beam reflected from the reflective surface 7a of polarized beam splitter 7, and directs it towards a multi-lens 10.

The multi-lens 10 is composed of a cylindrical lens 10a and a concave lens combined into unity. This multi-lens 10, while causing the incoming reflected beam to produce an astigmatism, converges it onto a light detector 11.

The light detector 11 has a light sensitive surface composed of six plates. This light sensitive detector 11 receives the light flux converged by the multi-lens 10, and generates an electric signal in accordance with the intensity of that light flux.

The optical pickup 1, based on the electric signal from the light detector 11, detects a focusing error signal by means of a focusing error detection circuit working on astigmatism detection, and a tracking error signal by means of a tracking error detection circuit working on a three-beam principle. Then, the optical pickup 1, based on the focusing error and tracking error signals, makes a servo-treatment which consists of adjusting the position of two-lens system 3 by properly activating the biaxial actuator 4. In addition, the optical pickup 1 writes and reads information signals onto and from the signal recording surface 51c of optical disc 51.

As is evident from above, the optical pickup 1, as long as it is provided with a two-lens system 3 where the interval $L_{14}$ between first and fourth lenses 15 and 18 corresponds with a reference value, can be free from any aberrations caused by errors in thickness of lenses constituting the two-lens system. In other words, as long as above requirement is met, the optical pickup 1 can write and read less degraded information signals onto and from the signal recording surface 51c of optical disc 51, even if there are errors in thickness of the lenses constituting the two-lens system 3.

In the following study, errors were intentionally introduced in thickness of the first lens 13 or second lens 14 of the two-lens system of this invention, and the resulting wavefront aberration was measured. The results were compared with those obtained from a conventional two-lens system into which the same errors have been introduced.

Firstly, for the two lens systems to be compared, their second lens was allowed to have an error of +10 μm in thickness, and the resulting wavefront aberrations were compared.

Figure 9:
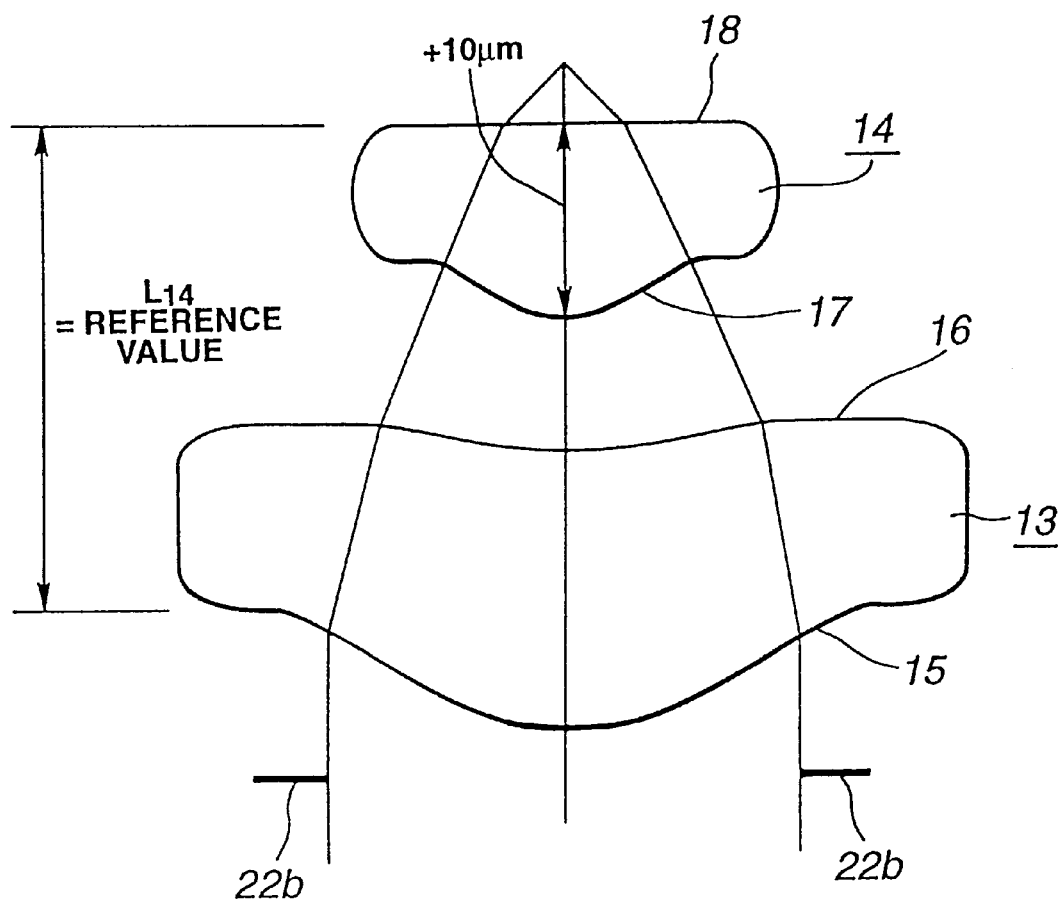
FIG. 9 gives a frontal view of the two-lens system where the second lens has an error of +10 $\mu$m in thickness.
Figure 10:
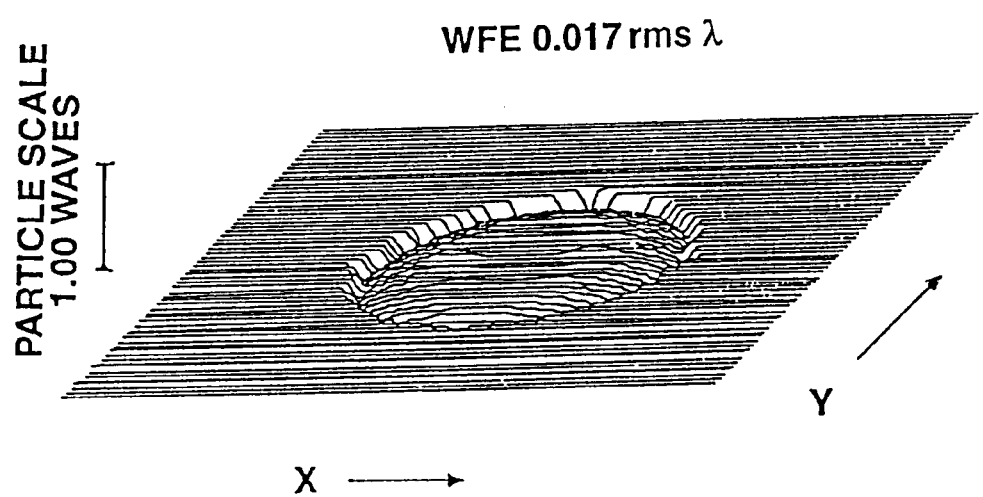
FIG. 10 gives the optical characteristics indicating wavefront aberrations when the two-lens system has the second lens with an error of +10 $\mu$m in thickness.

With the two-lens system 3 of this invention where the interval $L_{14}$ between the first and the fourth surfaces 15 and 18 corresponds with a reference value as shown in FIG. 9, the resulting wavefront aberrations and their RMS values are as shown in FIG. 10. In FIG. 10, the magnitude of wavefront aberrations is expressed relative to that of one wavelength. The RMS value of wavefront aberrations was 0.017 rms, or a sufficiently tolerable value.

Figure 11:
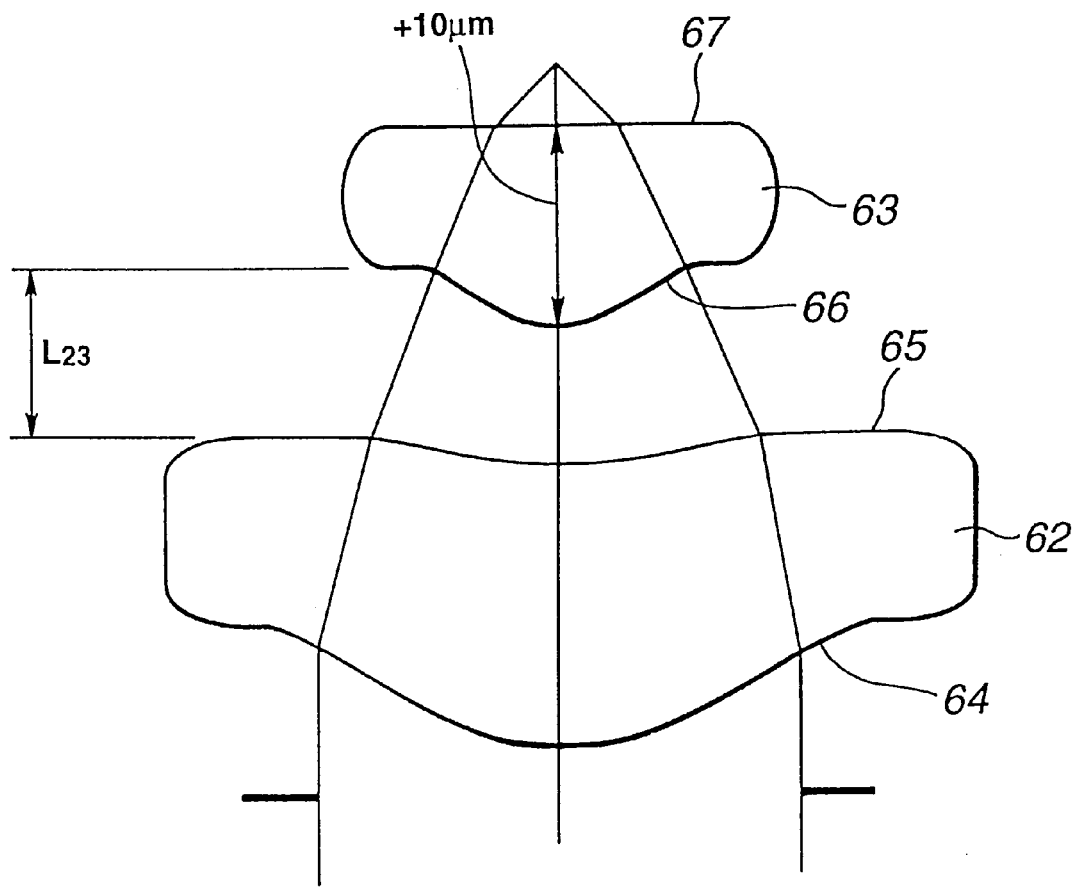
FIG. 11 gives a frontal view of a two-lens system serving as a comparative example which has a second lens with an error of +10 $\mu$m in thickness.
Figure 12:
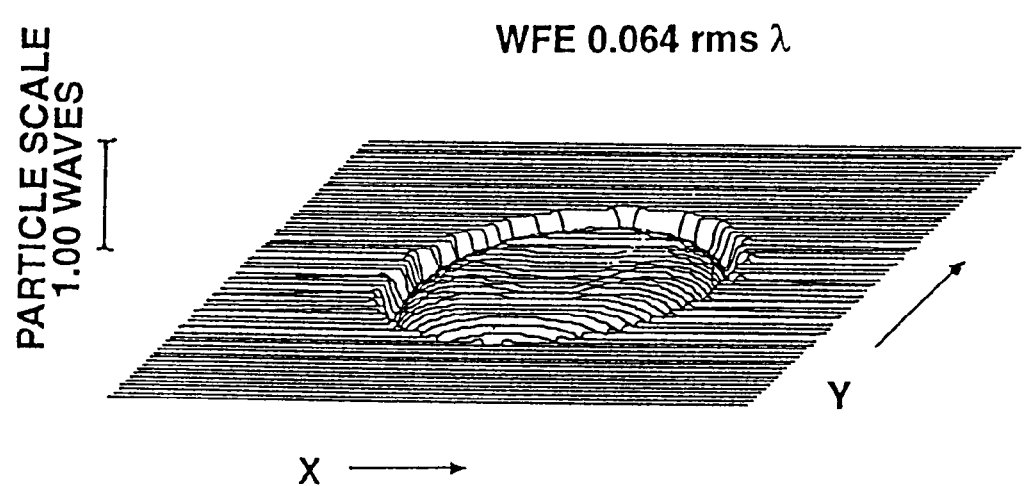
FIG. 12 gives the optical characteristics indicating wavefront aberrations of the comparative two-lens system which has the second lens with an error of +10 $\mu$m in thickness.

The comparative example consisted of, as shown in FIG. 11, a two-lens system 61 which had been constructed such that the interval $L_{23}$ between the second and third surfaces 65 and 66 became constant. The interval between the first and the fourth surfaces 64 and 67 of this comparative example was longer by 10 μm than the corresponding interval of the two-lens system of this invention or $L_{14}$ shown in FIG. 9. The wavefront aberrations obtained from the two-lens system 61 of comparative example are as shown in FIG. 12, and larger than the corresponding results of this invention shown in FIG. 10. The RMS value obtained from the comparative example was 0.064 rms or close to the upper tolerable limit.

As is evident from above, if an error of +10 μm arises in thickness of the second lens, a two-lens system where the interval $L_{14}$ between first and fourth lenses corresponds with a reference value or the two-lens system of this invention will give lower wavefront aberrations than a corresponding two-lens system with no such device.

Next, for the two lens systems to be compared, their second lens was allowed to have an error of −10 μm in thickness, and the resulting wavefront aberrations were compared.

Figure 13:
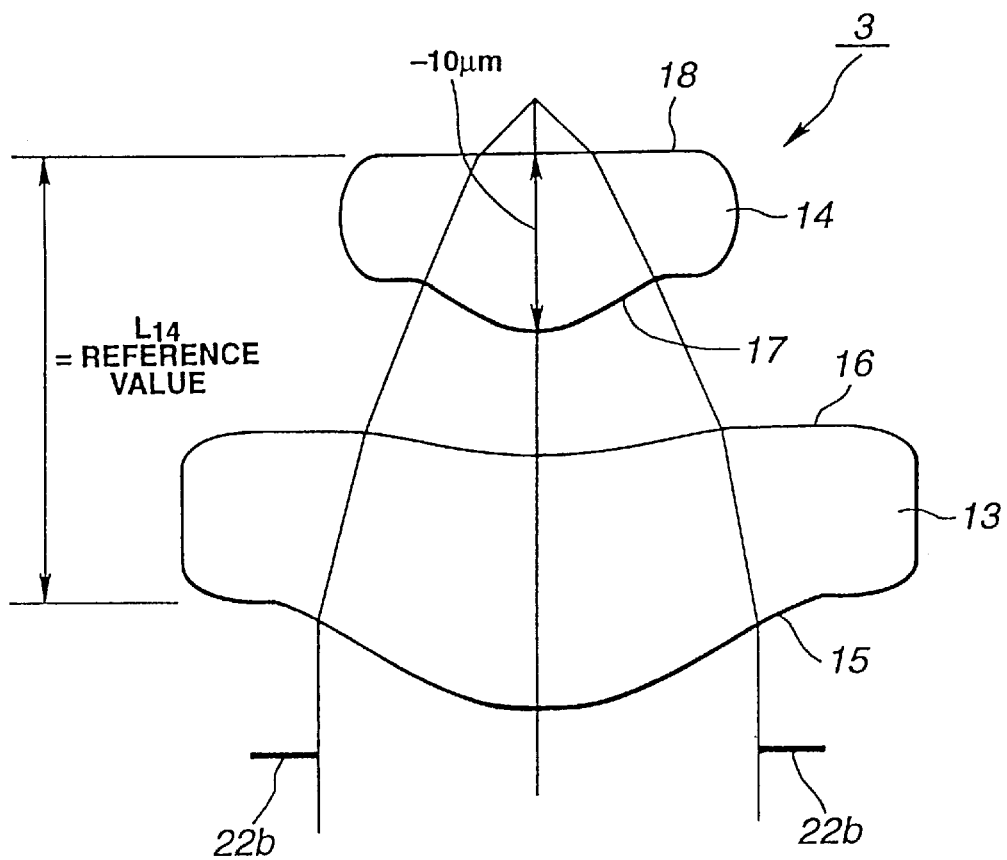
FIG. 13 gives a frontal view of the two-lens system which has the second lens with an error of −10 $\mu$m in thickness.
Figure 14:
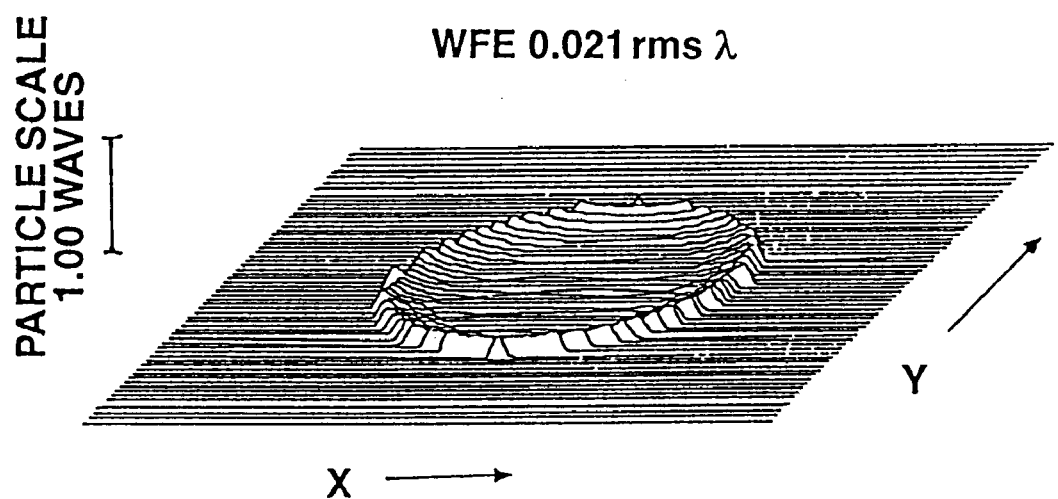
FIG. 14 gives the optical characteristics indicating wavefront aberrations of the two-lens system which has the second lens with an error of −10 $\mu$m in thickness.

With the two-lens system 3 of this invention where the interval $L_{14}$ between the first and the fourth surfaces 15 and 18 corresponds with a reference value as shown in FIG. 13, the resulting wavefront aberrations and their RMS values are as shown in FIG. 14. The RMS value of wavefront aberrations was 0.021 rms, or a sufficiently tolerable value.

Figure 15:
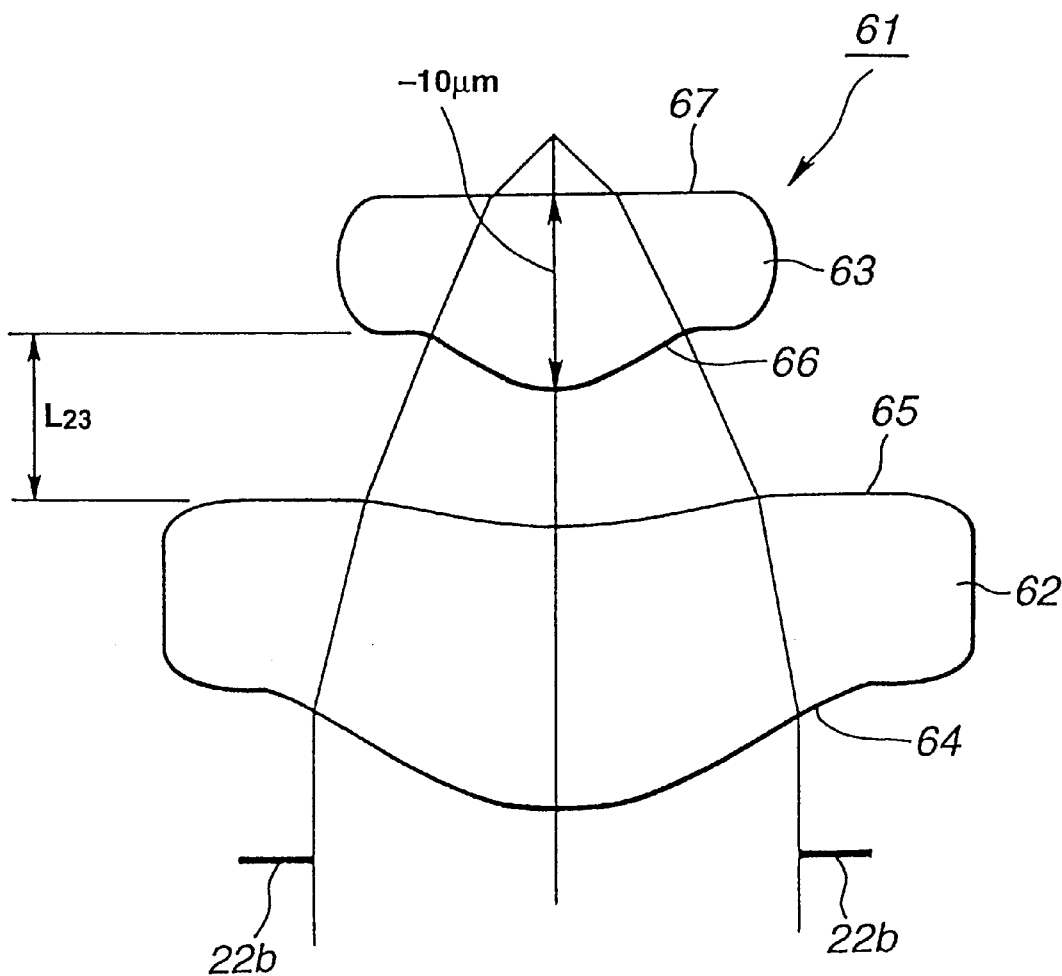
FIG. 15 gives a frontal view of the comparative two-lens system which has the second lens with an error of −10 $\mu$m in thickness.
Figure 16:
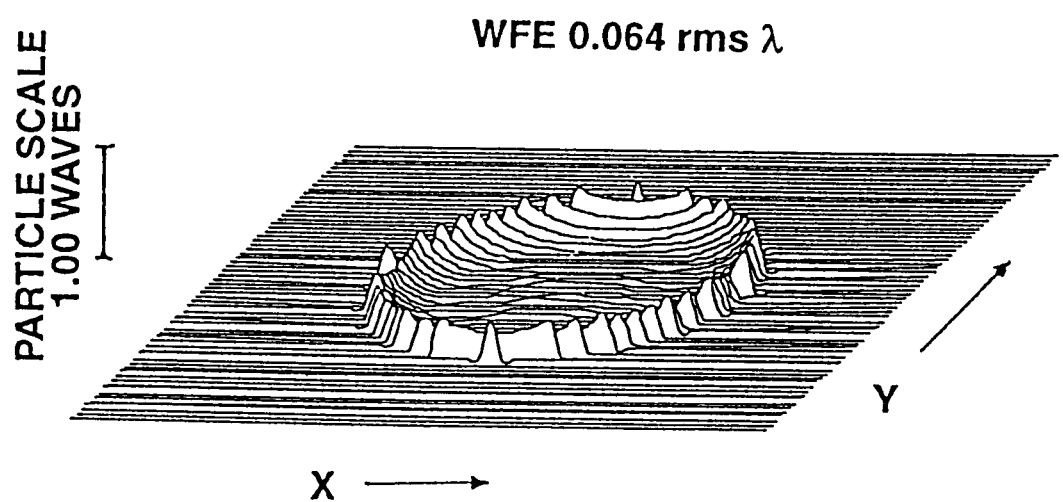
FIG. 16 gives the optical characteristics indicating wavefront aberrations of the comparative two-lens system which has the second lens with an error of −10 $\mu$m in thickness.

The comparative example consisted of, as shown in FIG. 15, a two-lens system 61 which had been constructed such that the interval $L_{23}$ between the second and the third surfaces 65 and 66 became constant. The interval between the first and the fourth surfaces 64 and 67 of this comparative example was shorter by 10 μm than the corresponding interval of two-lens system of this invention or $L_{14}$ shown in FIG. 13. The wavefront aberrations obtained from the two-lens system 61 of comparative example are as shown in FIG. 16, and larger than the corresponding results of this invention shown in FIG. 14. The RMS value of wavefront aberrations obtained from the comparative example was 0.064 rms or close to the upper tolerable limit.

As is evident from above, if an error of −10 μm arises in thickness of the second lens, a two-lens system where the interval $L_{14}$ between first and fourth lenses corresponds with a reference value, or the two-lens system of this invention will give lower wavefront aberrations than a corresponding two-lens system with no such device.

Figure 17:
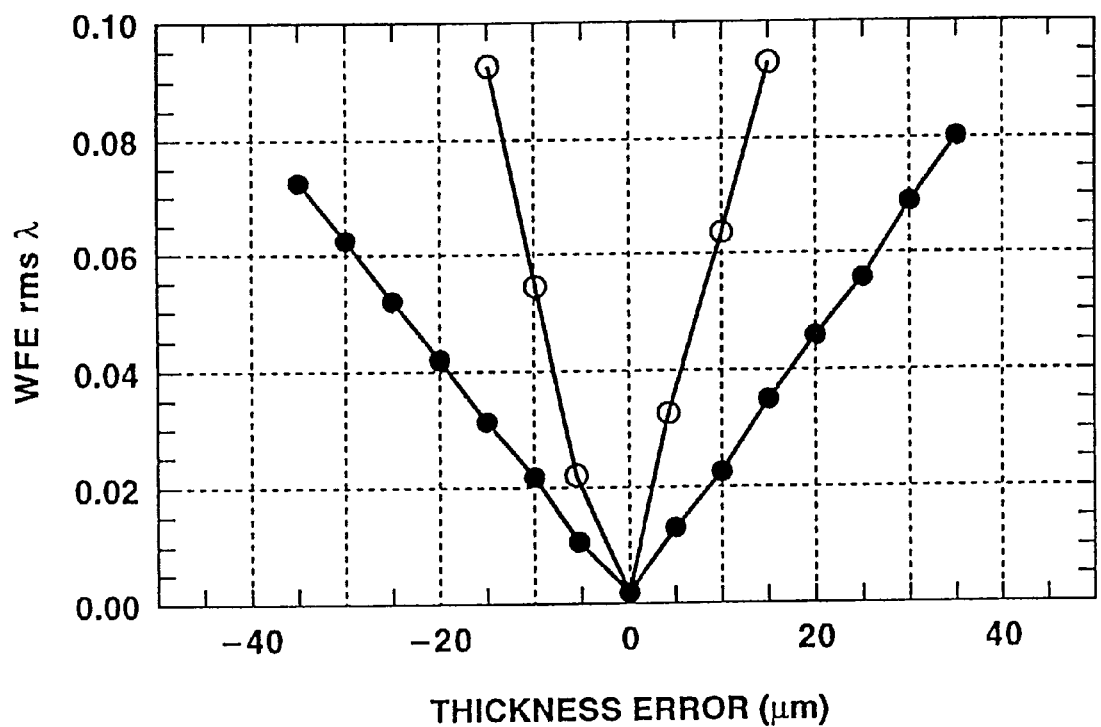
FIG. 17 gives the optical characteristics indicating the relationship between errors in thickness of the second lens and RMS values of wavefront aberrations.

FIG. 17 gives RMS values of wavefront aberrations as a function of errors in thickness of the second lens of the two-lens system. Solid circles (●) plot the results obtained from the two-lens system 3 where the interval $L_{14}$ of the first and the fourth surfaces 15 and 18 corresponds with a reference value, or the two-lens system of this invention, while open circles (○) plot the results obtained from the two-lens system 61 where the interval $L_{23}$ between the second and third surfaces 65 and 66 is constant, or the two-lens system of the comparative example.

When the second lens has an error in thickness ranging from −20 μm to +20 μm, the resulting RMS values of wavefront aberrations are obviously smaller for the two-lens system 3 where the interval $L_{14}$ between the first and the fourth surfaces 15 and 18 corresponds with a reference value, or the two-lens system of this invention than for the comparative two-lens system.

Next, for the two lens systems to be compared, their first lens was allowed to have an error of +10 μm in thickness, and the resulting wavefront aberrations were compared.

Figure 18:
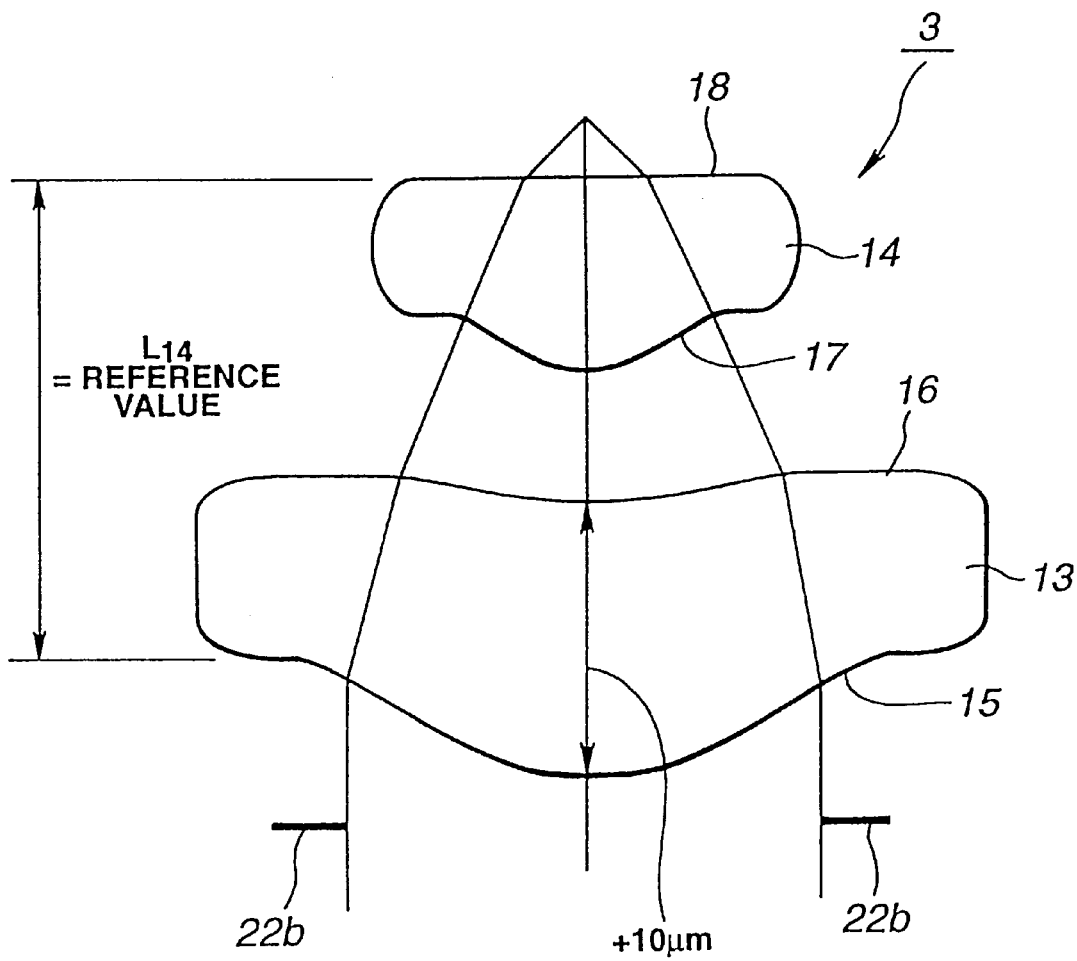
FIG. 18 gives a frontal view of the two-lens system which has the first lens with an error of +10 $\mu$m in thickness.
Figure 19:
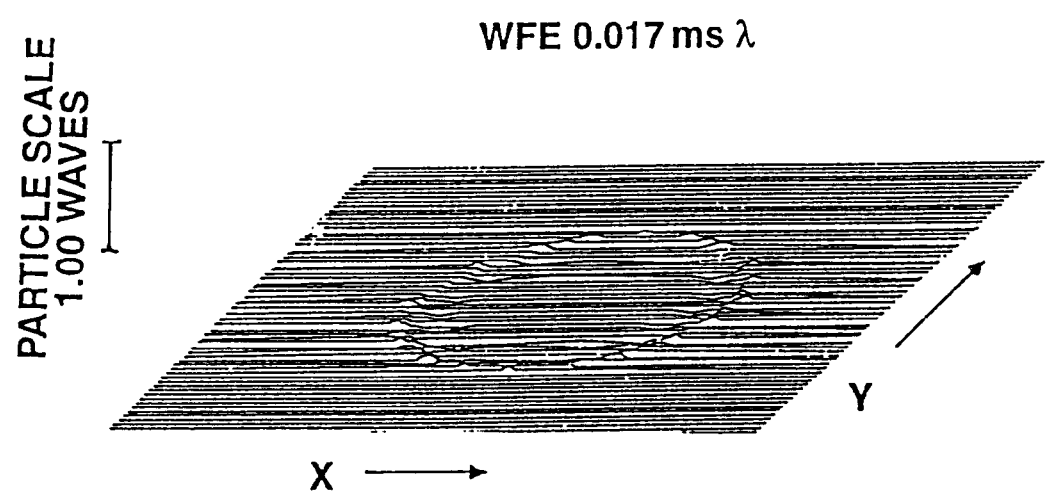
FIG. 19 gives the optical characteristics indicating wavefront aberrations when the two-lens system has the first lens with an error of +10 $\mu$m in thickness.

With the two-lens system 3 of this invention where the interval $L_{14}$ between the first and the fourth surfaces 15 and 18 corresponds with a reference value as shown in FIG. 18, the resulting wavefront aberrations and their RMS values are as shown in FIG. 19. The RMS value of wavefront aberrations was 0.017 rms, or a sufficiently tolerable value.

Figure 20:
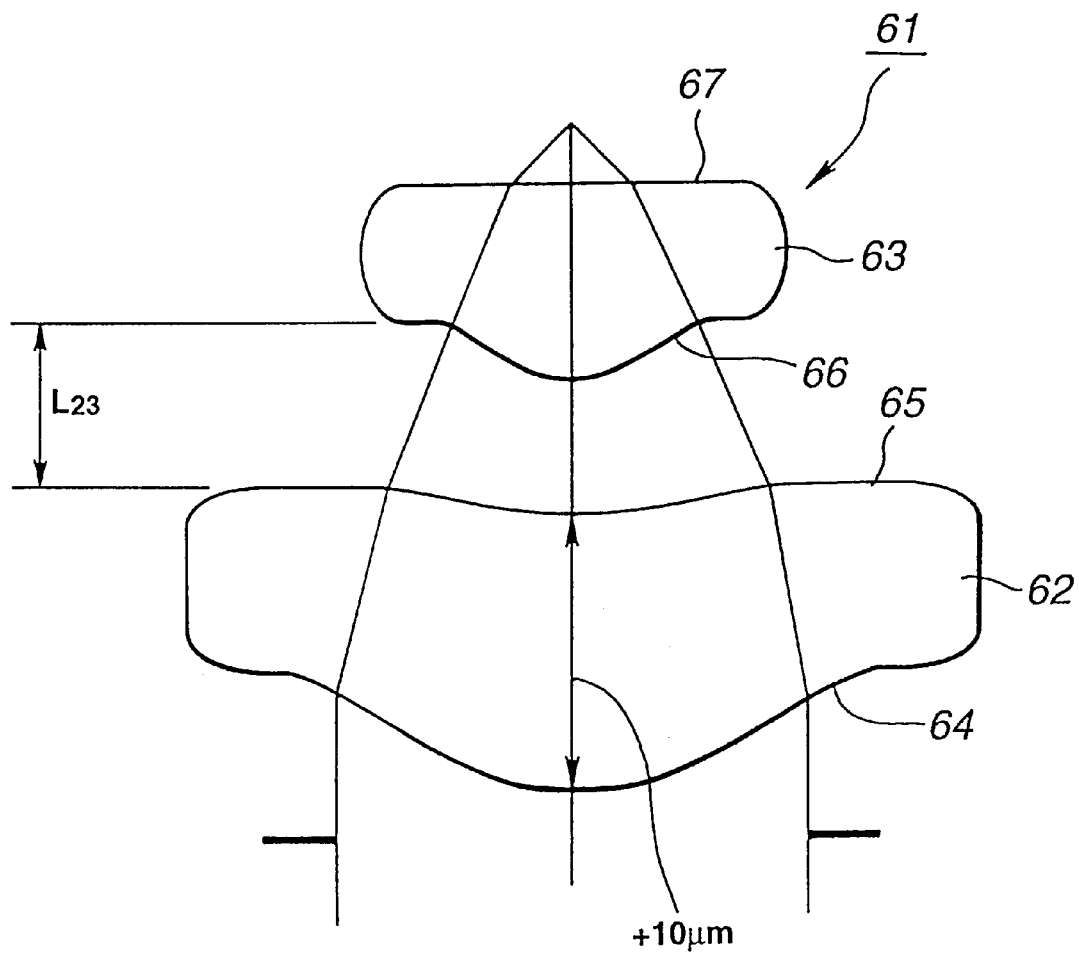
FIG. 20 gives a frontal view of the comparative two-lens system which has the first lens with an error of +10 $\mu$m in thickness.
Figure 21:
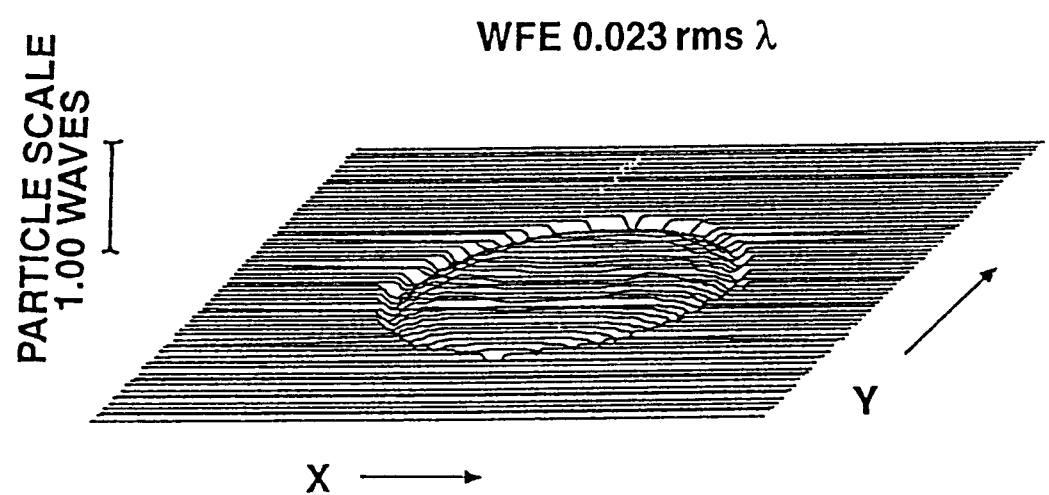
FIG. 21 gives the optical characteristics indicating wavefront aberrations of the comparative two-lens system which has the first lens with an error of +10 $\mu$m in thickness.

The comparative example consisted of, as shown in FIG. 20, a two-lens system 61 which had been constructed such that the interval $L_{23}$ between the second and the third surfaces 65 and 66 became constant. The interval between the first and the fourth surfaces 64 and 67 of this comparative example was longer by 10 μm than the corresponding interval of two-lens system of this invention or $L_{14}$ shown in FIG. 18. The wavefront aberrations obtained from the two-lens system 61 of comparative example are as shown in FIG. 21, and larger than the corresponding results of this invention shown in FIG. 19. The RMS value obtained from the comparative example was 0.023 rms.

As is evident from above, if an error of +10 μm arises in thickness of the first lens, a two-lens system where the interval $L_{14}$ between first and fourth lenses corresponds with a reference value, or the two-lens system of this invention will give lower wavefront aberrations than a corresponding two-lens system with no such device.

Figure 22:
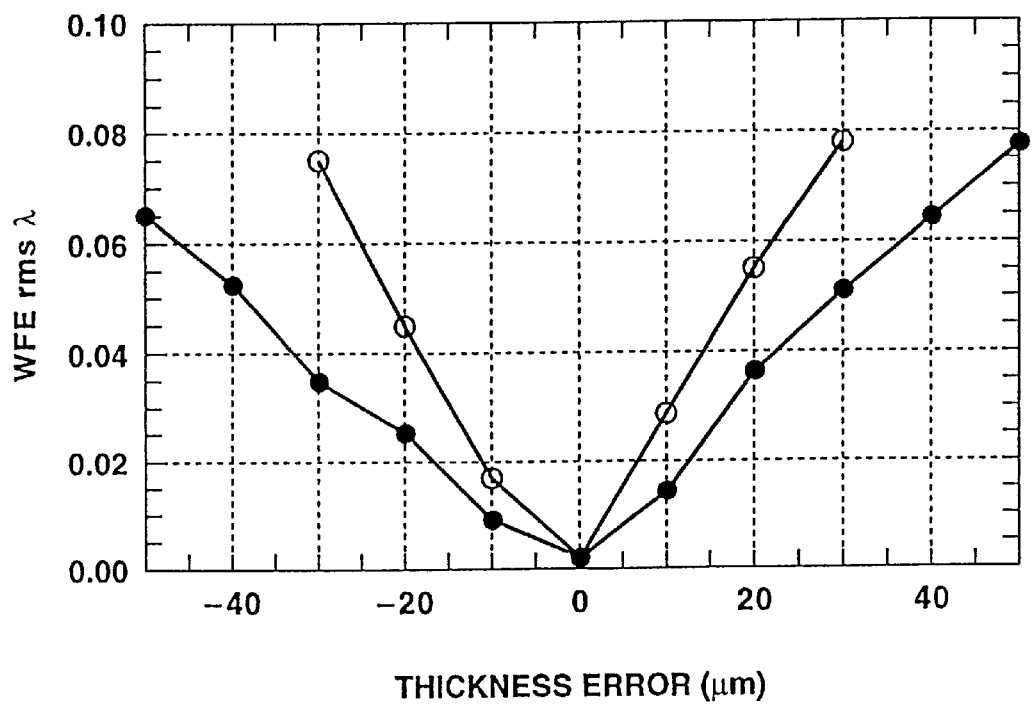
FIG. 22 gives the optical characteristics indicating the relationship between errors in thickness of the first lens and RMS values of wavefront aberrations.

FIG. 22 gives RMS values of wavefront aberrations as a function of errors in thickness of the first lens of the two-lens system. Solid circles (●) plot the results obtained from the two-lens system 3 where the interval $L_{14}$ of the first and the fourth surfaces 15 and 18 corresponds with a reference value, or the two-lens system of this invention, while open circles (○) plot the results obtained from the two-lens system 61 where the interval $L_{23}$ between the second and the third surfaces 65 and 66 is constant, or the two-lens system of the comparative example.

When the first lens has an error in thickness ranging from −30 μm to +30 μm, the resulting RMS values of wavefront aberrations are smaller for the two-lens system 3 where the interval $L_{14}$ between the first and the fourth surfaces 15 and 18 corresponds with a reference value, or the two-lens system of this invention than for the comparative two-lens system.

Figure 23:
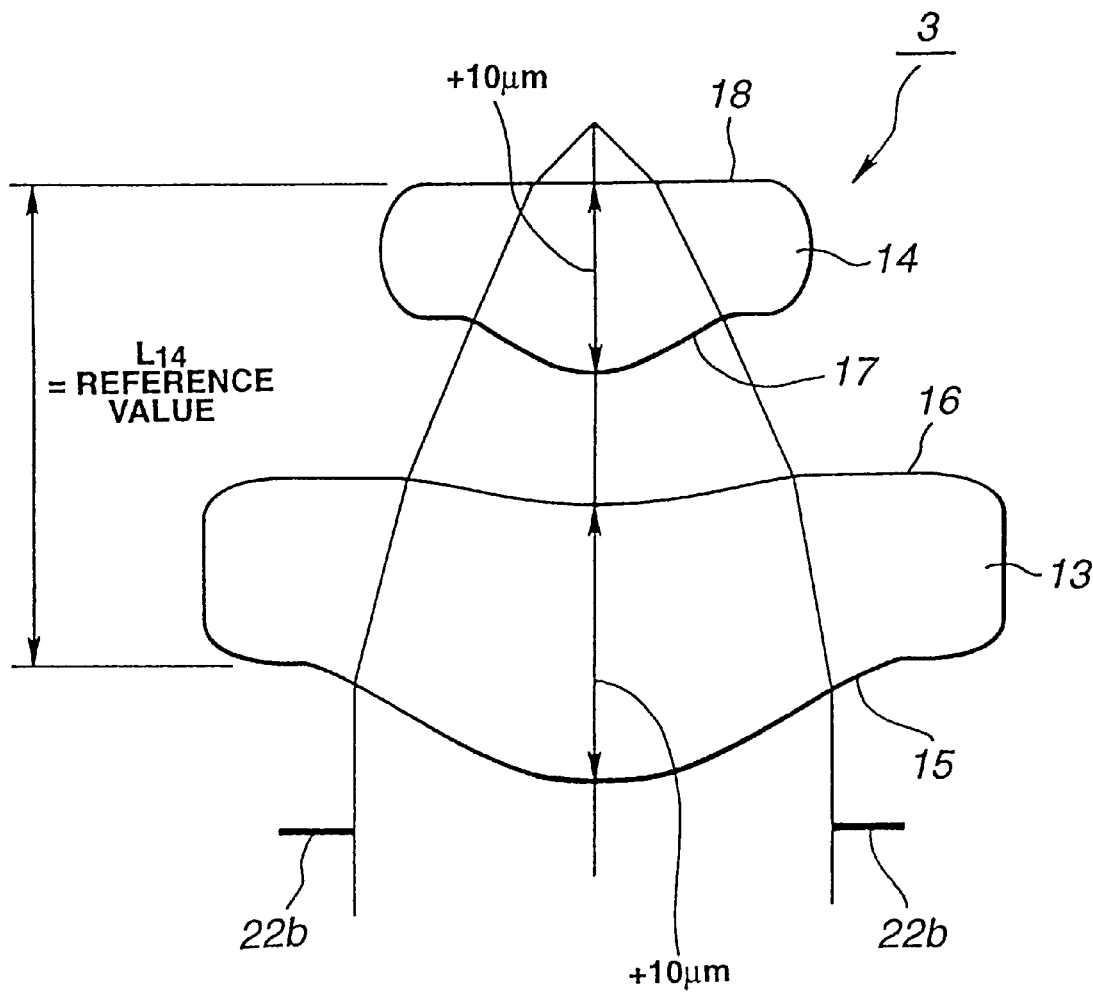
FIG. 23 gives a frontal view of the two-lens system in which each of the first and second lenses has an error of +10 $\mu$m in thickness.
Figure 24:
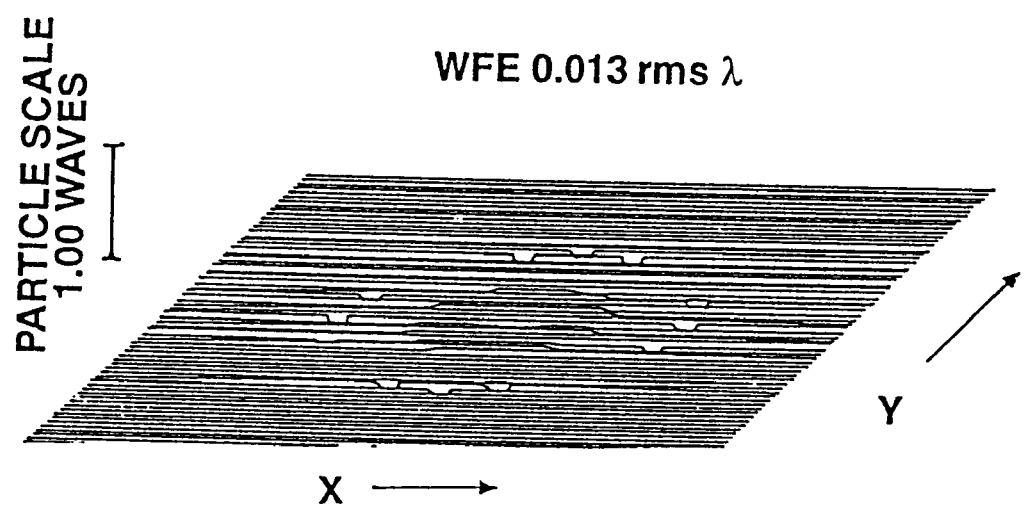
FIG. 24 gives the optical characteristics indicating wavefront aberrations of the two-lens system which has the first and second lenses with an error of +10 $\mu$m each.

With the two-lens system it is possible for each of the first and the second lenses 13 and 14 to have an error of +10 μm in thickness as shown in FIG. 23. However, as long as the interval $L_{14}$ between the first and the fourth surfaces 15 and 18 keeps a reference value, the resulting two-lens system will give practically no wavefront aberrations as seen from FIG. 24 The RMS value of wavefront aberrations will be 0.013 rms as shown in FIG. 24, or a sufficiently tolerable value.

Next, the second embodiment will be described below. The second embodiment, like the first one, is an optical pickup which converges a laser beam from a semiconductor laser through a two-lens system consisting of first and second lenses onto the signal recording surface of an optical disc.

Figure 26:
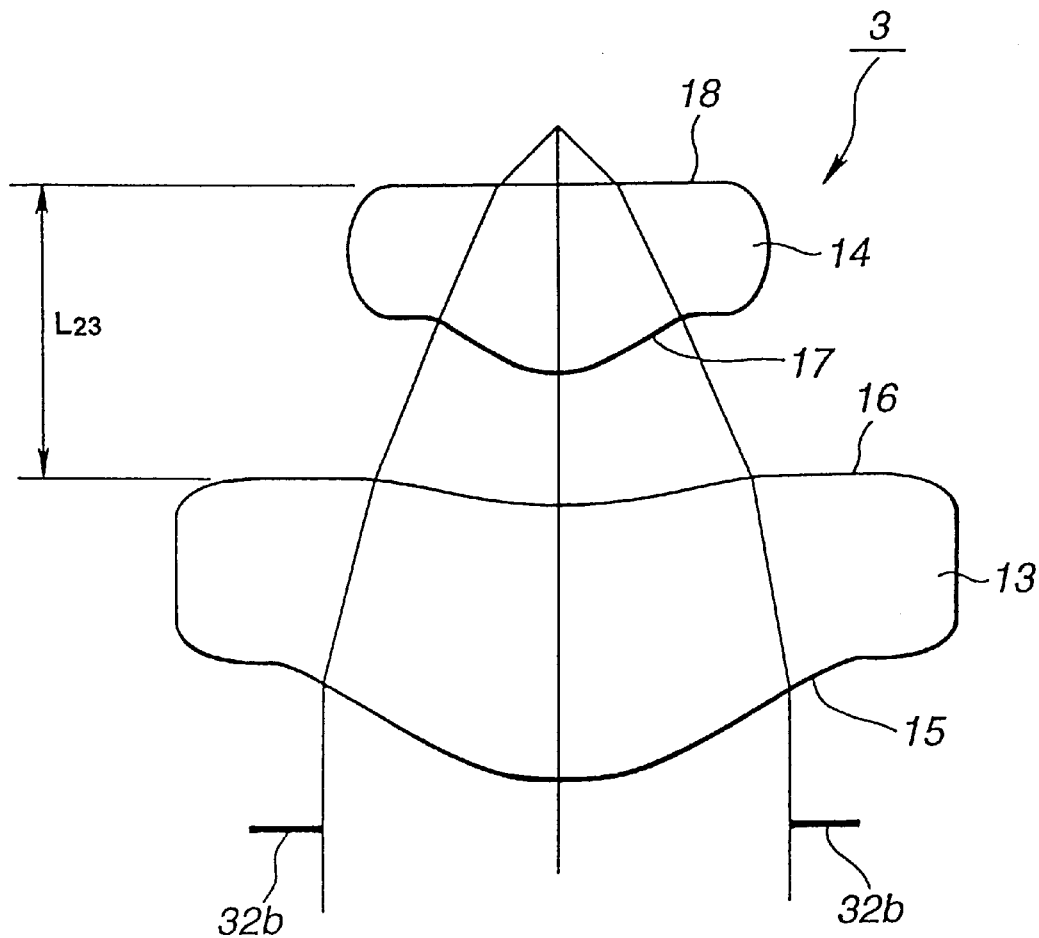
FIG. 26 gives a frontal view of a two-lens system installed in the optical pickup constituting the second example of this invention.

The two-lens system consists, as shown in FIG. 26, of: a first lens 13 having a first surface 15 upon which a laser beam from a semiconductor laser is incident and a second surface 16 which sends the laser beam transmitted from the first surface 15 towards a second lens 14; and a second lens 14 having a third surface upon which the light flux sent from the second surface 16 is incident and a fourth surface 18 which directs the light flux transmitted from the third surface 17 onto an optical disc placed opposite thereto.

The two-lens system 30 is so installed in an optical pickup 29 as to allow the interval $L_{24}$ between the second and the fourth surfaces 16 and 18 to correspond with a reference value.

For the optical pickup 29 representing the second embodiment, the same elements with those constituting the optical pickup 1 of the first embodiment will be represented by the same numerals, and their explanation will be omitted.

Figure 25:
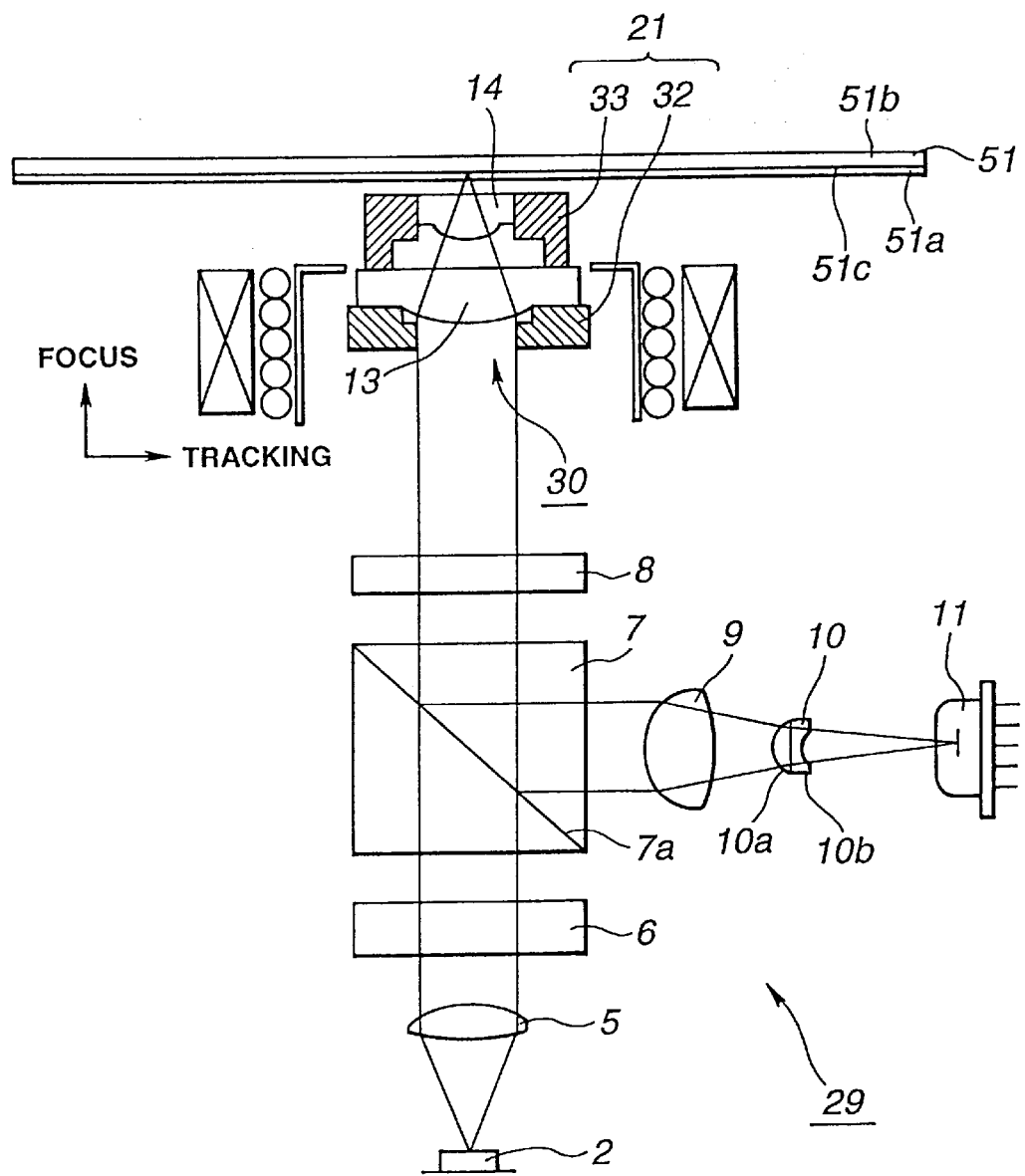
FIG. 25 illustrates the composition of an optical pickup constituting the second example of this invention.

The optical pickup 29 has, as shown in FIG. 25, a semiconductor laser 2 for emitting a laser beam and the two-lens system 30 which is aligned with the optical axis of the semiconductor laser 2 to converges the laser beam onto the recording surface 51c of optical disc 51. The optical pickup 29 is further provided with a biaxial actuator 4 to support the two-lens system 30.

The optical pickup 29 still further has a collimator lens 5 inserted between the semiconductor laser 2 and two-lens system 30 with its optical axis aligned, a diffraction grating 6, a polarized beam splitter 7 and a λ4 wavelength plate 8 when enumerated in order from the side of the semiconductor laser 2.

The optical pickup 29 is still further provided with a converging lens 9, a multi-lens 10 and a photodetector 11 at a place upon which a beam reflected from an optical disc 51 and further reflected from the reflective surface 7a of polarized beam splitter 7 is incident.

With the above-described two-lens system 30, the first and the second lenses 13 and 14 are constructed in the same way as with the corresponding lenses of the first embodiment described earlier.

The two-lens system 30 is designed to place the second lens 14 apart from the first lens 13 so much as to give a reference value interval $L_{24}$ between the second and the fourth surfaces 16 and 18. The two-lens system 30 can be said to contain, so to say, another refractive lens (third lens) made of air between the first and the second lenses 13 and 14. As the second lens 14 has a larger aperture number against incoming light flux than does the first lens 13, transformations due to wall thickness are less with the second lens 14 than with the first lens 13. Accordingly, if errors in thickness of the second lens 14 can be corrected properly, aberrations of the lens system in question can be limited within a sufficiently tolerable level.

Even if an error arises in thickness of the second lens of two-lens system 30, the third lens described above will receive forcibly an extra thickness of the same absolute value of that error.

Let's assume that the second lens 14 has an error in thickness which causes it to develop an aberration. However, it also causes the third lens to produce an aberration of opposite polarity to that caused by the second lens, to cancel out the latter.

To put it otherwise, with the two-lens system 30, even when an error arises in thickness of the second lens 14, the error is compensated in the total system because the same error with the opposite polarity occurs concurrently in the third lens.

Accordingly, as long as the two-lens system 30 is assembled such that the interval $L_{24}$ between the second and the fourth surfaces 16 and 18 corresponds with a reference value, aberrations caused by errors in the thickness of lenses can be prevented.

As a result, even when the two-glass lens 30 is manufactured through glass-molding, and suffers from an error in thickness due to work precision, aberrations caused by that error can be prevented.

Figure 27:
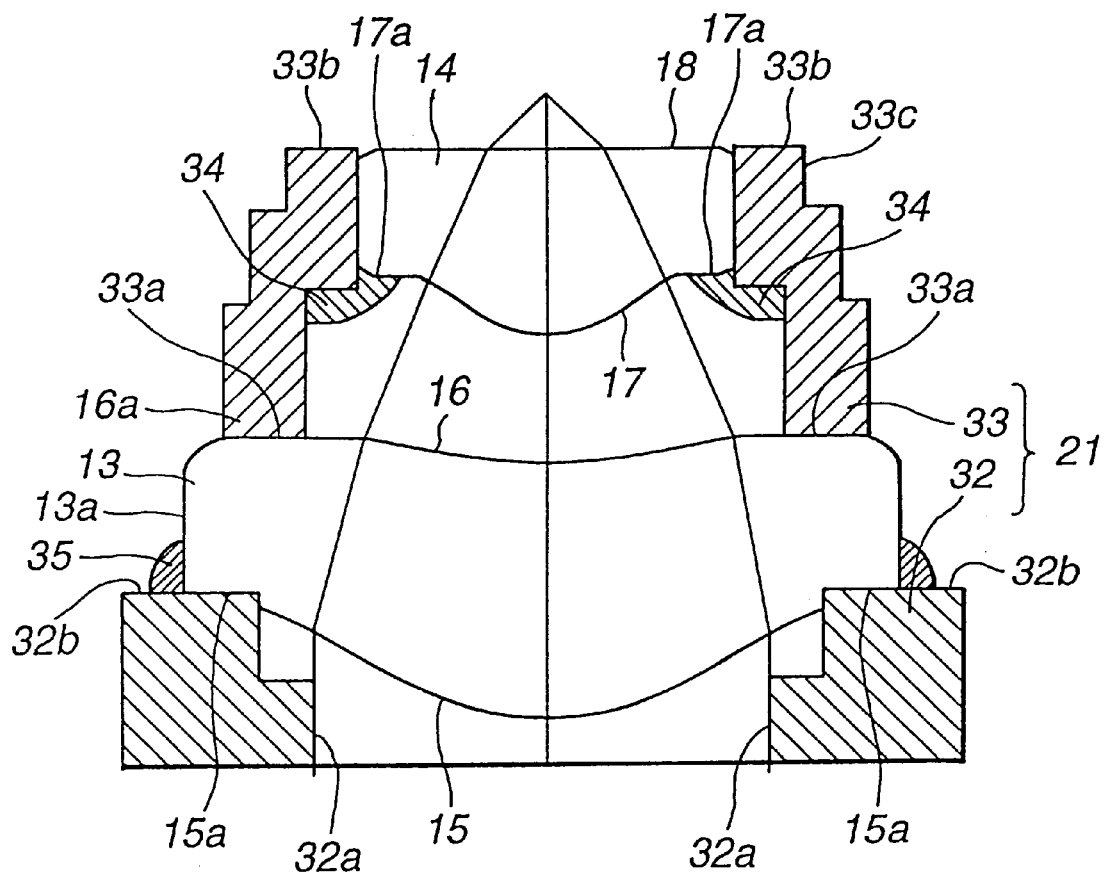
FIG. 27 gives a sectional view of the lens tube incorporating the two-lens system.

With the optical pickup 1, as shown in FIG. 27, the two-lens system 30 is composed of the first and the second lenses 13 and 14 placed in a lens tube 31.

The lens tube 31 is composed of a lens supporting section 32 to support the first lens 13 and a lens storing section 33 to store the second lens 14. The lens tube 21 has first and second mounting reference surfaces 33a and 33b in the lens storing section 33. The first and second mounting reference surfaces 33a and 33b are designed such that their interval corresponds with a reference value, and will serve as references when positioning of the first and the second lenses 13 and 14 is carried out.

The lens supporting section 32 of lens tube 31 has a cylindrical shape. The lens supporting section 32 has a diaphragm 32a to adjust the intensity of incoming light flux and a supporting surface 32b to support the first lens 13 at its one end. The first lens 13 is stabilized by attaching the periphery 15a of first surface 15 to the supporting surface 32b. Namely, the lens supporting section adjusts the flux of light incident on the first lens 13 supported by the lens supporting surface 32b using the diaphragm 32a.

The lens storing section 33 of lens tube 31 has an internal diameter slightly larger than the external diameter of first lens 13, and has an approximately cylindrical shape.

The lens storing section 33 has, on one end, a first mounting reference surface 33a which joins with the first lens 13, and has, on the other end, a second mounting reference surface 33b. The lens storing section 33 has, in addition, a lens holder 32c which has an internal diameter nearly the same with the external diameter of second lens 14.

The second lens 14 is stored in the second storing segment 33c in such a way as to make the fourth surface 18 flush with the second mounting reference surface 33b. The second lens 14 is fixed to the lens storing section 33 through an adhesive 34.

The lens storing section 33 has the first mounting reference surface 33a jointed with the periphery 16a of second surface 16 of first lens 13. The first lens 13 is jointed with the lens supporting section 32b through an adhesive 35.

Thus, with the two-lens system 30, the fourth surface 18 becomes flush with the second mounting reference surface 33b, and the first reference surface 33a of lens storing section 33 comes into contact with the second surface 16. This arrangement ensures the interval $L_{24}$ between the second and the fourth surfaces 16 and 18 to correspond with a reference value.

The optical pickup 29, as long as it is provided with a two-lens system 3 where the interval $L_{24}$ between second and fourth lenses 16 and 18 corresponds with a reference value, can reduce wavefront aberrations. In other words, as long as above requirement is met, the optical pickup 29 can write and read less degraded information signals onto and from the signal recording surface of an optical disc, even if there are errors in thickness of the lenses constituting the two-lens system 30.

Figure 28:
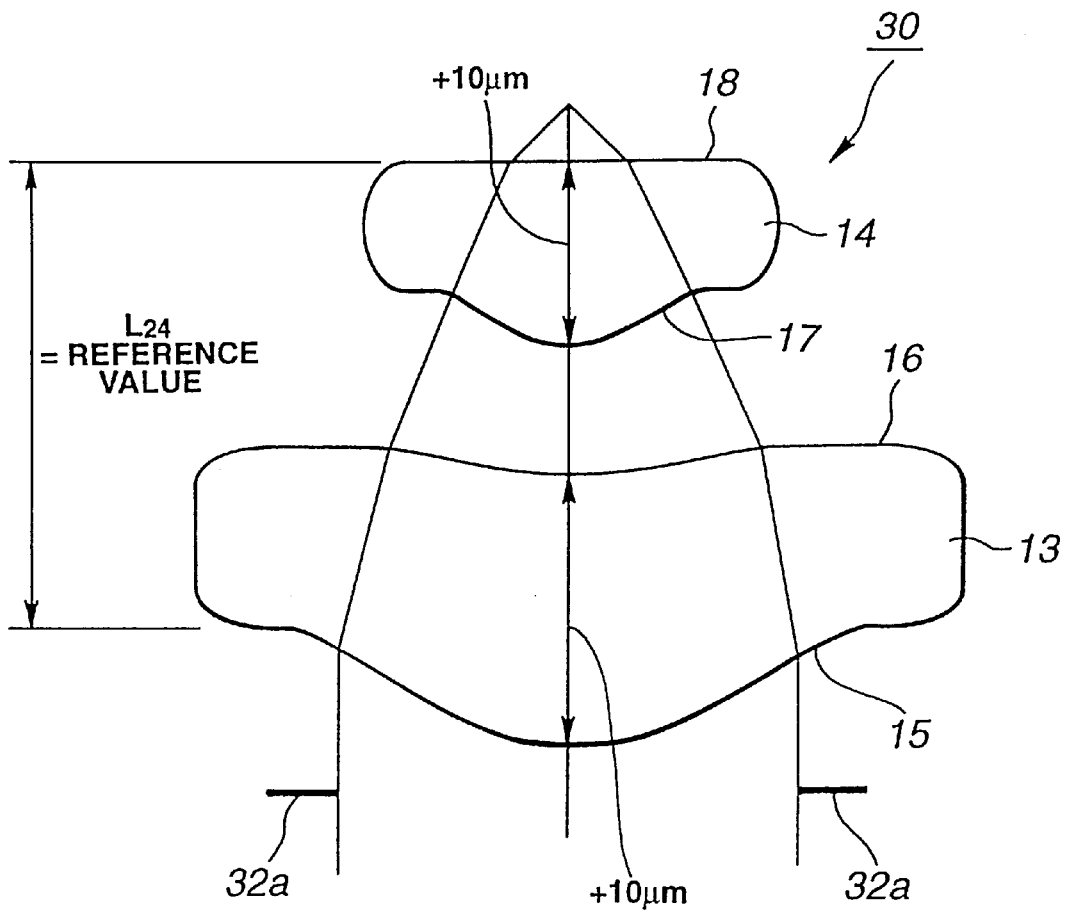
FIG. 28 gives a frontal view of the two-lens system incorporated in the optical pickup constituting the second example of this invention which has first and second lenses with an error of +10 $\mu$m in thickness each.
Figure 29:
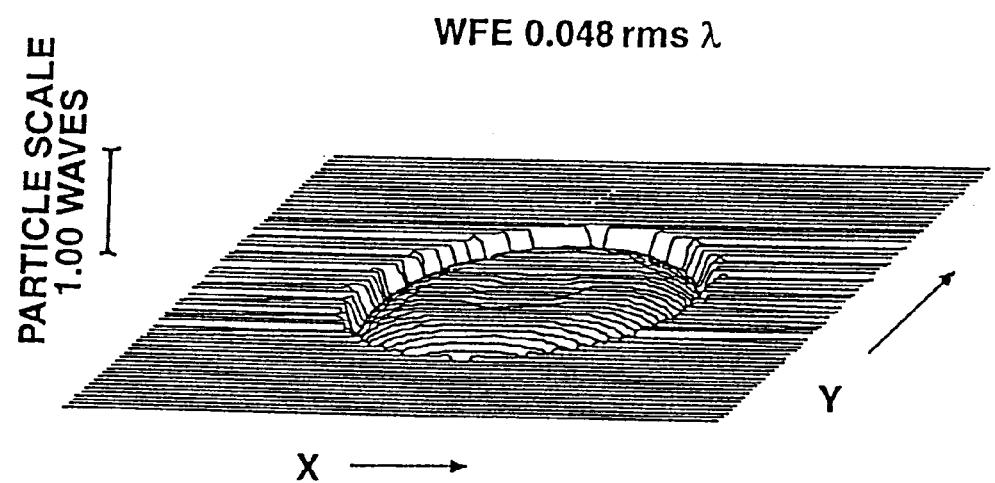
FIG. 29 gives the optical characteristics indicating wavefront aberrations of two-lens system incorporated in the pickup constituting the second example of this invention, which has the first and second lenses with an error of +10 $\mu$m in thickness each.

With the two-lens system 30, the first and the second lenses 13 and 14 were allowed to have an error of +10 $\mu$m in thickness each, and the resulting wavefront aberrations are shown in FIG. 29. The experimental condition was as represented by FIG. 28: the first and the second lenses had an error of +10 $\mu$m in thickness each. In this case, however, as the interval $L_{24}$ between second and fourth surfaces 16 and 18 corresponded with a reference value, the resulting two-lens system gave wavefront aberrations as seen from FIG. 29 The RMS value of wavefront aberrations was 0.048 rms or a sufficiently tolerable value.

In the above description of optical pickups representing the first and the second embodiments, the first lens of two-lens system was exclusively exposed to incident light with parallel fluxes, but the above description can be applied to the two-lens system whose first lens is exposed to light emanating from a source at a finite distance.

The optical pickup of this invention, being provided with the lens tube wherein reference surfaces for mounting of first and fourth lens surfaces of the two-lens system are provided to allow those lens surfaces to be positioned with an interval of a reference value between them, can limit aberrations within a tolerable range without resorting to a special device even if errors are produced in the lens thickness of two-lens system.

Further, the optical pickup of this invention, being provided with the lens tube wherein reference surfaces for mounting of second and fourth lens surfaces of the two-lens system are provided to allow those lens surfaces to be positioned with an interval of a reference value between them, can limit aberrations within a tolerable range without resorting to a special device even if errors are produced in the lens thickness of two-lens system.

Furthermore, the method of this invention for assembling objective lenses of an optical pickup consists of assembling the two-lens system such that the second and fourth surfaces may have an interval of a reference value, thereby limiting aberrations within a tolerable range without resorting to a special device even if errors are produced in the lens thickness of two-lens system.

Still further, the method of this invention for assembling objective lenses of an optical pickup consists of assembling the two-lens system such that the second and fourth surfaces have an interval of a reference value, thereby limiting aberrations within a tolerable range without resorting to a special device even if errors are produced in the lens thickness of two-lens system.

What is claimed is:

1. An optical pickup comprising a two-lens system having at least one aspheric surface, wherein a lens tube is provided in such a manner that a reference value is a design length between a flat part in a mounting reference surface of a first surface of said two-lens system incident to a laser beam, and a flat part in a mounting reference surface of a fourth surface of said two-lens system incident to a laser beam.

2. An optical pickup comprising a two-lens system having at least one aspheric surface, wherein a lens tube is provided in such a manner that a reference value is a design length between a flat part in a mounting reference surface of a second surface of said two-lens system incident to a laser beam, and a flat part in a mounting reference surface of a fourth surface of said two-lens system incident to a laser beam.

3. An optical pickup as claimed in claim 2, wherein said fourth surface is arranged to face an optical recording medium.

4. An optical pickup objective lens assembling method for assembling method for assembling a two-lens system having at least one aspheric surface for an optical pickup, wherein said two-lens system is assembled so that a distance between a flat part of a first surface and a flat part of a fourth surface is a reference value.

5. An optical pickup objective lens assembling method as claimed in claim 4, wherein a lens tube is provided so as to have a mounting reference surface with an identical distance as said reference value, and said flat part of first surface and said flat part of fourth surface are mounted on the same surface as said mounting references surface.

6. An optical pickup objective lens assembling method for assembling a two-lens system having at least one aspheric surface for an optical pickup, wherein said two-lens system is assembled so that a distance between a flat part of a second surface and a flat part of a fourth surface is a reference value.

7. An optical pickup objective lens assembling method as claimed in claim 6, wherein a lens tube is provided so as to have a mounting reference surface with an identical distance as said reference value, and said flat part of second surface and said flat part of fourth surface are mounted on the same surface as said mounting reference surface.

8. An optical pickup objective lens assembling method as claimed in claim 6, wherein said fourth surface is arranged so as to face an optical recording medium.

* * * * *

UNITED STATES PATENT AND TRADEMARK OFFICE
CERTIFICATE OF CORRECTION

PATENT NO. : 6,055,113
DATED : April 25, 2000
INVENTOR(S) : YAMAMOTO et al.

It is certified that error appears in the above-identified patent and that said Letters Patent is hereby corrected as shown below:

Column 14, line 56, claim 4, line 1, should read;

4. An optical pickup objective lens assembling method for assembling a two-lens system having at least one aspheric surface for an optical pickup, wherein said two-lens system is assembled so that a distance between a flat part of a first surface and a flat part of a fourth surface is a reference value.

Signed and Sealed this

Twenty-ninth Day of May, 2001

*Attest:*

NICHOLAS P. GODICI

*Attesting Officer*     *Acting Director of the United States Patent and Trademark Office*